United States Patent
Goodman et al.

(10) Patent No.: US 10,839,852 B2
(45) Date of Patent: *Nov. 17, 2020

(54) LOG SNAPSHOT CONTROL ON AN AUTOMATED DATA STORAGE LIBRARY

(71) Applicant: International Business Machines Corporation, Armonk, NY (US)

(72) Inventors: Brian G. Goodman, Tucson, AZ (US); Jose G. Miranda-Gavillan, Tucson, AZ (US); Kenny N. Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,294

(22) Filed: Sep. 21, 2016

(65) Prior Publication Data

US 2018/0081572 A1    Mar. 22, 2018

(51) Int. Cl.
    *G06F 3/06* (2006.01)
    *G11B 15/68* (2006.01)
    *G06F 11/07* (2006.01)
    *G06F 12/16* (2006.01)

(52) U.S. Cl.
    CPC ........ *G11B 15/689* (2013.01); *G06F 11/0727* (2013.01); *G06F 11/0787* (2013.01); *G06F 12/16* (2013.01); *G11B 15/68* (2013.01); *G11B 15/6885* (2013.01)

(58) Field of Classification Search
    CPC .............................. G06F 12/16; G06F 11/0727
    See application file for complete search history.

(56) References Cited

U.S. PATENT DOCUMENTS

| | | | |
|---|---|---|---|
| 5,864,655 A * | 1/1999 | Dewey | G06F 11/1076 714/42 |
| 6,038,379 A | 3/2000 | Fletcher et al. | |
| 6,247,141 B1 | 6/2001 | Holmberg | |
| 6,314,502 B1 | 11/2001 | Piersol | |
| 6,363,332 B1 * | 3/2002 | Rangarajan | G05B 19/4063 701/31.9 |
| 6,487,474 B1 | 11/2002 | Goodman et al. | |
| 6,664,760 B2 | 12/2003 | Kobayashi | |
| 6,718,447 B2 | 4/2004 | Cochran | |
| 7,155,306 B2 | 12/2006 | Haitin et al. | |
| 7,162,496 B2 | 1/2007 | Amarendran et al. | |
| 7,203,732 B2 | 4/2007 | McCabe et al. | |

(Continued)

OTHER PUBLICATIONS

Goodman et al., U.S. Appl. No. 15/272,303, filed Sep. 21, 2016.

(Continued)

*Primary Examiner* — Charles Rones
*Assistant Examiner* — Tian-Pong Chang
(74) *Attorney, Agent, or Firm* — Zilka-Kotab, P.C.

(57) ABSTRACT

A system, according to one embodiment, includes: an automated data storage library which includes a designated physical mechanism accessible at the automated data storage library, and a memory. The automated data storage library is configured to capture a snapshot of one or more logs in response to the designated physical mechanism being triggered. The automated data storage library is also configured to store the snapshot in the memory. Other systems, methods, and computer program products are described in additional embodiments.

18 Claims, 13 Drawing Sheets

(56) References Cited

U.S. PATENT DOCUMENTS

| | | | |
|---|---|---|---|
| 7,415,585 B1* | 8/2008 | Rossi | G06F 11/1458 |
| | | | 711/161 |
| 7,506,010 B2 | 3/2009 | Kulkarni et al. | |
| 7,516,366 B2 | 4/2009 | Lev et al. | |
| 7,539,783 B2 | 5/2009 | Kochunni et al. | |
| 7,574,462 B2 | 8/2009 | Amano et al. | |
| 7,587,264 B2 | 9/2009 | Furuno et al. | |
| 7,594,059 B2* | 9/2009 | Townsend | H04B 1/0475 |
| | | | 710/313 |
| 7,603,386 B2 | 10/2009 | Amarendran et al. | |
| 7,650,531 B2 | 1/2010 | Yeung et al. | |
| 7,657,666 B2 | 2/2010 | Kottomtharayil et al. | |
| 7,660,943 B2 | 2/2010 | Goodman et al. | |
| 7,702,830 B2 | 4/2010 | Brunet et al. | |
| 7,813,913 B2 | 10/2010 | Collins et al. | |
| 7,818,160 B2 | 10/2010 | Collins et al. | |
| 7,899,662 B2 | 3/2011 | Brunet et al. | |
| 7,917,551 B2 | 3/2011 | Chikusa et al. | |
| 7,933,033 B2 | 4/2011 | Ohishi et al. | |
| 7,941,501 B2 | 5/2011 | McCabe et al. | |
| 8,001,345 B2 | 8/2011 | Wayda et al. | |
| 8,074,035 B1 | 12/2011 | Per et al. | |
| 8,117,492 B1 | 2/2012 | Searls et al. | |
| 8,171,345 B2 | 5/2012 | Chaudhari et al. | |
| 8,195,445 B2 | 6/2012 | Brunet et al. | |
| 8,230,066 B2 | 7/2012 | Heil | |
| 8,291,261 B2 | 10/2012 | Malleck et al. | |
| 8,321,792 B1* | 11/2012 | Alur | G06Q 10/10 |
| | | | 715/742 |
| 8,332,354 B1 | 12/2012 | Chatterjee et al. | |
| 8,339,649 B2 | 12/2012 | Ohishi et al. | |
| 8,352,717 B2 | 1/2013 | Campbell et al. | |
| 8,380,678 B2 | 2/2013 | Manson | |
| 8,412,898 B2 | 4/2013 | Camborde | |
| 8,433,732 B2 | 4/2013 | Lam | |
| 8,505,025 B2 | 8/2013 | Nakamura | |
| 8,593,678 B2 | 11/2013 | Ohishi et al. | |
| 8,667,240 B2 | 3/2014 | Camborde | |
| 8,713,271 B2 | 4/2014 | Sundrani | |
| 8,719,286 B1 | 5/2014 | Xing et al. | |
| 8,726,075 B1 | 5/2014 | Lerner | |
| 8,751,515 B1 | 6/2014 | Xing et al. | |
| 8,762,328 B2 | 6/2014 | McCabe et al. | |
| 8,775,378 B2 | 7/2014 | Cisler et al. | |
| 8,819,005 B2 | 8/2014 | Hooks | |
| 8,849,143 B2 | 9/2014 | Raga | |
| 8,856,202 B2 | 10/2014 | McCabe et al. | |
| 8,886,903 B2 | 11/2014 | Kono et al. | |
| 8,966,315 B2 | 2/2015 | Burn et al. | |
| 9,009,115 B2 | 4/2015 | Cisler et al. | |
| 9,015,435 B2 | 4/2015 | Kono et al. | |
| 9,026,498 B2 | 5/2015 | Kumarasamy | |
| 9,037,572 B2* | 5/2015 | Jones | G07C 5/0866 |
| | | | 701/36 |
| 9,043,566 B2 | 5/2015 | Jeong et al. | |
| 9,075,705 B2 | 7/2015 | Hikichi | |
| 9,087,014 B1 | 7/2015 | Jennas, II et al. | |
| 9,092,182 B2 | 7/2015 | Ohishi et al. | |
| 9,116,853 B1 | 8/2015 | Jennas, II et al. | |
| 9,176,679 B2 | 11/2015 | Oberhofer et al. | |
| 9,189,344 B2 | 11/2015 | Kono et al. | |
| 9,192,024 B2* | 11/2015 | Ohta | H05B 37/02 |
| 9,223,500 B1 | 12/2015 | Lemar et al. | |
| 9,270,752 B2 | 2/2016 | McCabe et al. | |
| 9,330,424 B2* | 5/2016 | Parikh | G06Q 50/06 |
| 9,330,507 B2* | 5/2016 | Alberry | G07C 5/0825 |
| 9,344,596 B2 | 5/2016 | Ohishi et al. | |
| 9,354,984 B2 | 5/2016 | Hooks | |
| 9,396,200 B2* | 7/2016 | Jacoby | G06F 17/30088 |
| 9,423,973 B2 | 8/2016 | Crawford et al. | |
| 9,495,251 B2* | 11/2016 | Kottomtharayil | G06F 11/1448 |
| 2002/0091807 A1 | 7/2002 | Goodman | |
| 2002/0188887 A1 | 12/2002 | Largman et al. | |
| 2002/0199077 A1 | 12/2002 | Goodman et al. | |
| 2003/0051109 A1 | 3/2003 | Cochran | |
| 2003/0098670 A1 | 5/2003 | Kobayashi | |
| 2003/0120384 A1 | 6/2003 | Haitin et al. | |
| 2004/0148477 A1 | 7/2004 | Cochran | |
| 2004/0225634 A1 | 11/2004 | Prasad et al. | |
| 2005/0138312 A1* | 6/2005 | Kubo | G06F 11/1466 |
| | | | 711/162 |
| 2005/0289260 A1 | 12/2005 | Hamer et al. | |
| 2006/0005074 A1 | 1/2006 | Yanai et al. | |
| 2006/0010107 A1* | 1/2006 | Nguyen | G06F 11/1458 |
| 2006/0020569 A1 | 1/2006 | Goodman et al. | |
| 2006/0206547 A1 | 9/2006 | Kulkarni et al. | |
| 2006/0206759 A1 | 9/2006 | Chih | |
| 2006/0288057 A1 | 12/2006 | Collins et al. | |
| 2007/0088461 A1 | 4/2007 | Haitin et al. | |
| 2007/0106697 A1 | 5/2007 | Amarendran et al. | |
| 2007/0115738 A1 | 5/2007 | Emaru et al. | |
| 2007/0143096 A1 | 6/2007 | Brunet et al. | |
| 2007/0198773 A1 | 8/2007 | Goodman et al. | |
| 2008/0140902 A1 | 6/2008 | Townsend | |
| 2008/0281875 A1 | 11/2008 | Wayda et al. | |
| 2010/0268993 A1 | 10/2010 | Chaudhari et al. | |
| 2011/0236049 A1 | 9/2011 | Haga | |
| 2013/0080720 A1 | 3/2013 | Nakamura | |
| 2013/0097397 A1* | 4/2013 | Sundrani | G06F 11/1461 |
| | | | 711/162 |
| 2014/0032204 A1 | 1/2014 | Suresh et al. | |
| 2014/0059311 A1 | 2/2014 | Oberhofer et al. | |
| 2014/0068212 A1 | 3/2014 | Lin et al. | |
| 2014/0101567 A1 | 4/2014 | Kay et al. | |
| 2014/0173268 A1 | 6/2014 | Hashimoto | |
| 2014/0177000 A1 | 6/2014 | Heil | |
| 2014/0244951 A1 | 8/2014 | Baron et al. | |
| 2014/0347764 A1* | 11/2014 | Miller | G11B 15/689 |
| | | | 360/72.3 |
| 2014/0365479 A1 | 12/2014 | Lyons et al. | |
| 2014/0365825 A1 | 12/2014 | Hooks | |
| 2015/0241873 A1 | 8/2015 | Goldenberg et al. | |
| 2015/0248335 A1 | 9/2015 | Young et al. | |
| 2015/0378838 A1 | 12/2015 | Oberhofer et al. | |
| 2016/0139998 A1 | 5/2016 | Dunn et al. | |
| 2016/0239377 A1 | 8/2016 | Hooks | |
| 2018/0081573 A1 | 3/2018 | Goodman et al. | |

OTHER PUBLICATIONS

List of IBM Patents or Patent Applications Treated as Related.

Final Office Action from U.S. Appl. No. 15/272,303, dated May 5, 2017.

Non-Final Office Action from U.S. Appl. No. 15/272,303, dated Dec. 22, 2016.

Webopedia, "Mouse," https://web.archive.org/web/20021 01 0061424/http://www.webopedia.com/TERM/m/mouse.html, Oct. 10, 2002, pp. 1-2.

Cook, R., "The Advantages of Tape for Data Backup," https://web.archive.org/web/2011 091 8081525/http://searchdatabackup. techtarget.com/tip/The -advantages-of -tape-for-databackup, Sep. 18, 2011, pp. 1-11.

Examiner's Answer to Appeal Brief from U.S. Appl. No. 15/272,303, dated Dec. 15, 2017.

Patent Board Decision on Appeal from U.S. Appl. No. 15/272,303, dated Jan. 31, 2019.

Non-Final Office Action from U.S. Appl. No. 15/272,303, dated Apr. 12, 2019.

Final Office Action from U.S. Appl. No. 15/272,303, dated Jul. 30, 2019.

Advisory Action from U.S. Appl. No. 15/272,303, dated Oct. 23, 2019.

Non-Final Office Action from U.S. Appl. No. 15/272,303, dated Nov. 29, 2019.

Webopedia, "Display Screen," Apr. 10, 2001, 2 pages, https://web.archive.org/web/20010410184356/https//www.webopedia.com/TERM/D/display_screen.html.

Merriam-Webster, "screen," Definition from Merriam-Webster Online Dictionary, 2006, 1 page, retrieved from https://web.archive.org/web/20061211222428/https://www.merriam-webster.com/dictionary/screen.

(56) References Cited

OTHER PUBLICATIONS

Computer Hope, "GUI," Jun. 2001, 1 page, retrieved from https://web.archive.org/web/20010620202655/https://www.computerhope.com/jargon/g/gui.htm.

How Stuff Works, "How do touch-sensitive lamps work?" TLC Science, How Stuff Works, Jun. 2011, 2 pages, retrieved from https://web.archive.org/web/20110605040338/https://science.howstuffworks.com/innovation/science-questions/touch-sensitive-lamp.htm.

PC Magazine Encyclopedia, "circular buffer," definition, May 2013, 2 pages, retrieved from https://web.archive.org/web/20130510014441/https://www.pcmag.com/encyclopedia/term/39701/circular-buffer.

Cooke, S., "The Bip Buffer—The Circular Buffer With a Twist," Code Project, Sep. 19, 2014, 11 pages, retrieved from https://www.codeproject.com/Articles/3479/The-Bip-Buffer-The-Circular-Buffer-with-a-Twist.

Smith, S., "The Scientist and Engineer's Guide to Digital Signal Processing," Circular Buffering, Chapter 28, Feb. 2012, 2 pages, retrieved from https://web.archive.org/web/20120211123027/https://www.dspguide.com/ch28/2.htm.

Final Office Action from U.S. Appl. No. 15/272,303, dated Mar. 5, 2020.

Notice of Allowance from U.S. Appl. No. 15/272,303, dated May 18, 2020.

\* cited by examiner

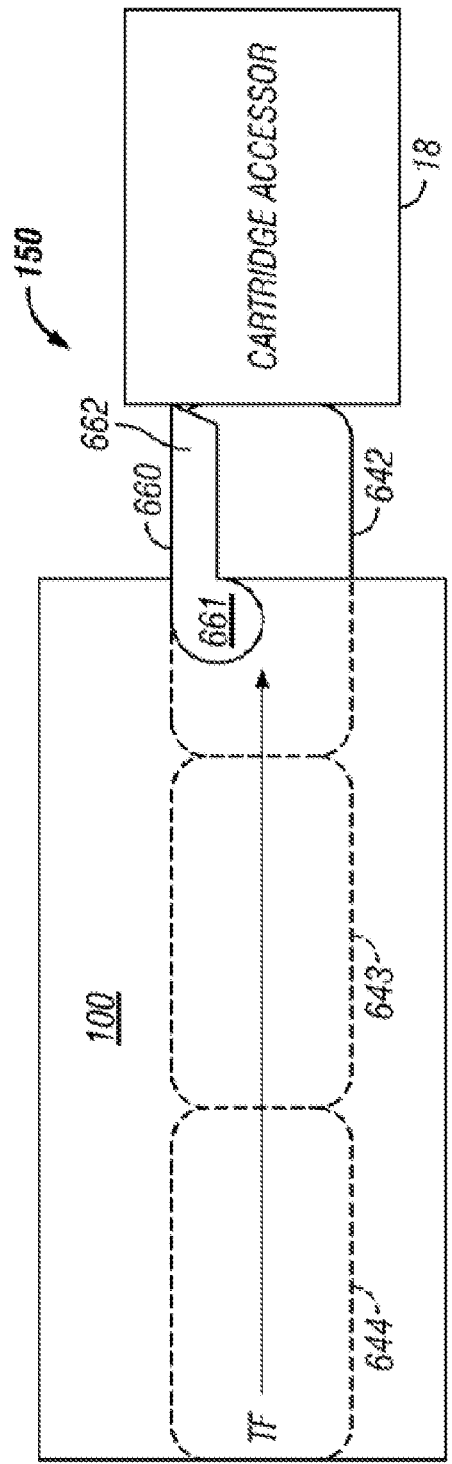
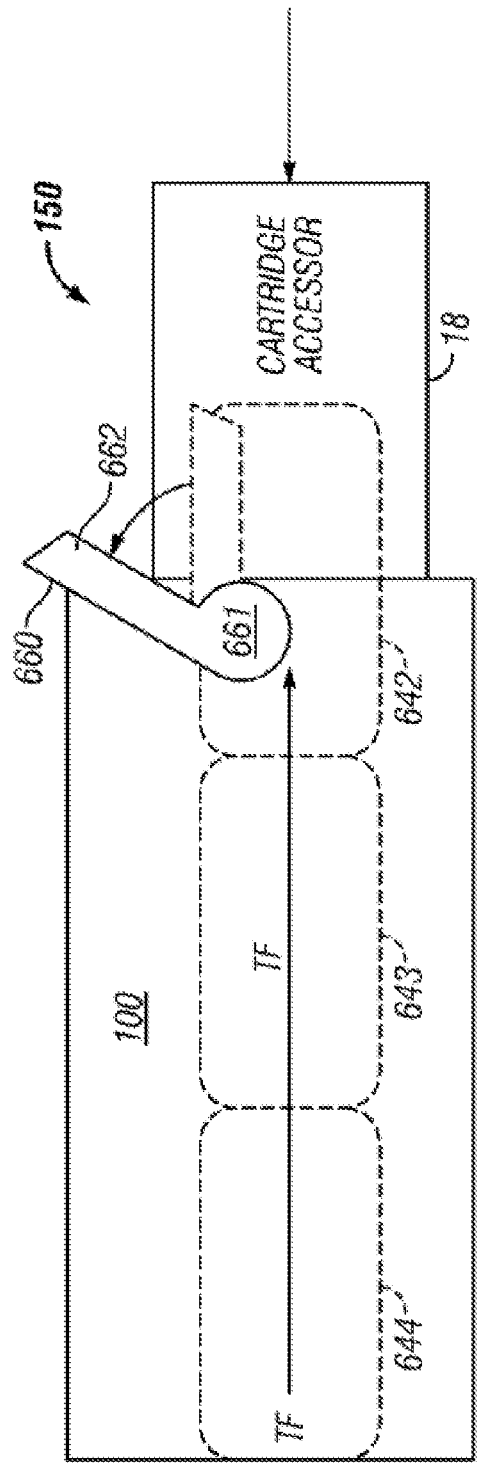
FIG. 8A
FIG. 8B

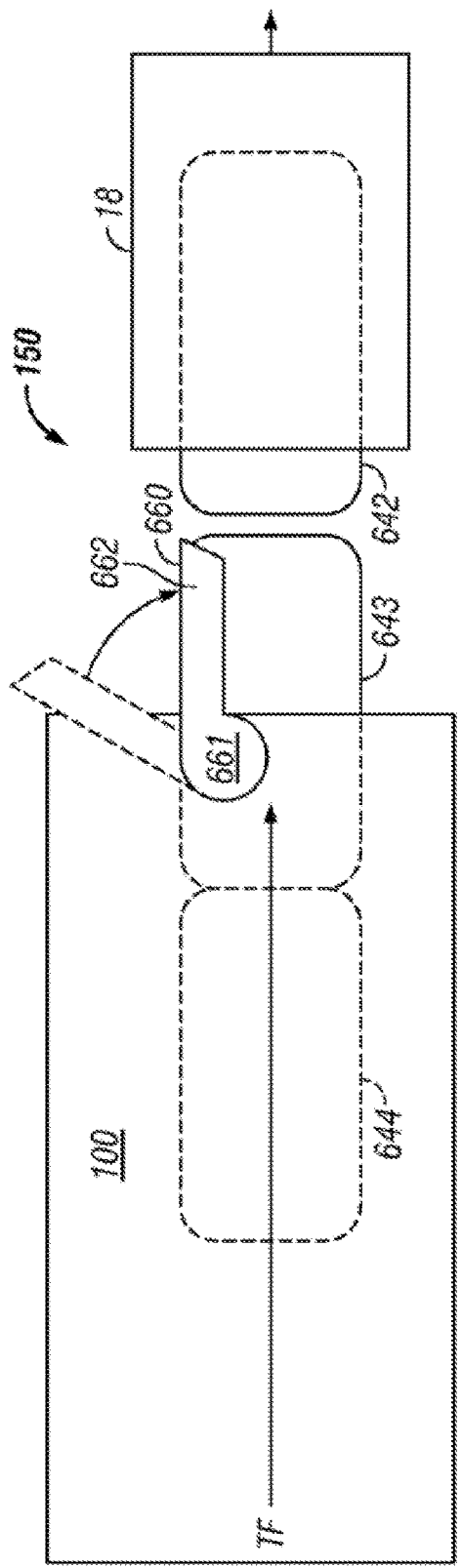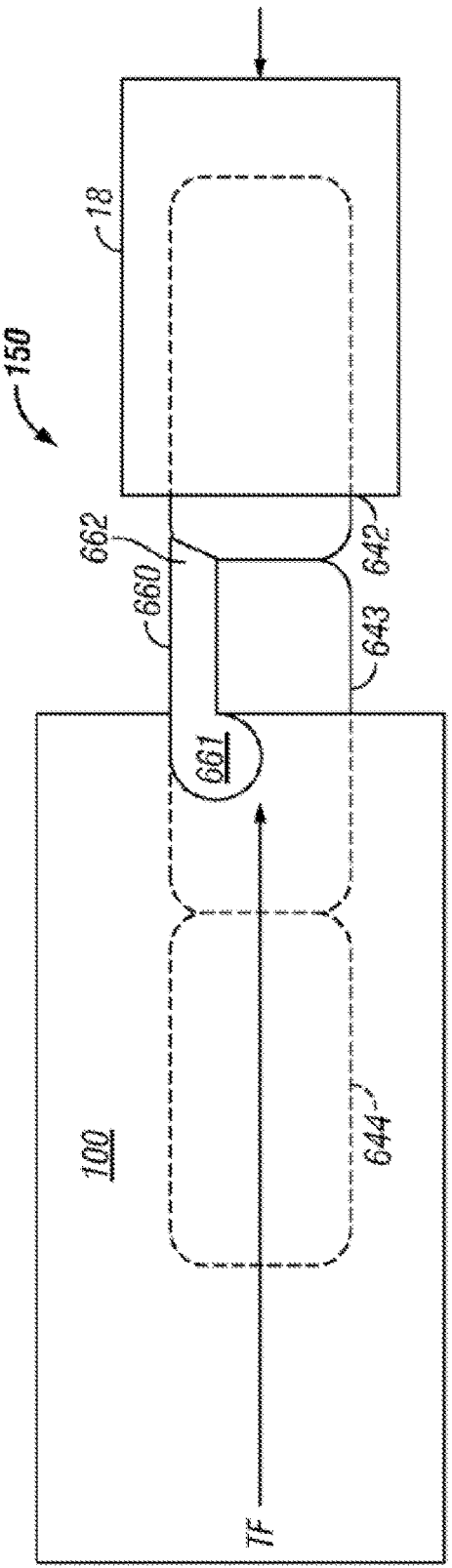

LOG SNAPSHOT CONTROL ON AN AUTOMATED DATA STORAGE LIBRARY

BACKGROUND

The present invention relates to data storage systems, and more particularly, this invention relates to log snapshot control for automated data storage libraries.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

Automated data storage libraries also use logs to provide diagnostic information related to the performance of the library. In existing storage libraries, logs are typically gathered through a web user interface or automatically upon detecting that a condition has occurred.

SUMMARY

A system, according to one embodiment, includes: an automated data storage library which includes a designated physical mechanism accessible at the automated data storage library, and a memory. The automated data storage library is configured to capture a snapshot of one or more logs in response to the designated physical mechanism being triggered. The automated data storage library is also configured to store the snapshot in the memory.

A system, according to another embodiment, includes: an automated data storage library which includes: a designated logical mechanism accessible on a display device of the automated data storage library, and a memory. The automated data storage library is configured to capture a snapshot of one or more logs in response to the designated logical mechanism being triggered. The automated data storage library is also configured to store the snapshot in the memory.

A system, according to yet another embodiment, includes: an automated data storage library which includes: a designated physical mechanism accessible at the automated data storage library, and a memory. The automated data storage library is configured to capture a snapshot of one or more logs in response to the designated physical mechanism being triggered, with a proviso that the designated physical mechanism is triggerable without performing any other preliminary steps. The automated data storage library is also configured to store the snapshot in the memory. Moreover, the designated physical mechanism is a switch or a mechanism that physically moves upon application of a force thereto.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems that may be able to capture a snapshot of one or more data logs in direct response to triggering a designated physical and/or logical mechanism, as well as operation and/or component parts thereof. Moreover, the snapshot may be captured without requiring any further action, e.g., such as a system login, access verification, library commands, software navigation, data collection prompts, etc., as will be described in further detail below.

In one general embodiment, a system includes: an automated data storage library which includes a designated physical mechanism accessible at the automated data storage library, and a memory. The automated data storage library is configured to capture a snapshot of one or more logs in response to the designated physical mechanism being triggered. The automated data storage library is also configured to store the snapshot in the memory.

In another general embodiment, a system includes: an automated data storage library which includes: a designated logical mechanism accessible on a display device of the automated data storage library, and a memory. The automated data storage library is configured to capture a snapshot of one or more logs in response to the designated logical mechanism being triggered. The automated data storage library is also configured to store the snapshot in the memory.

In yet another general embodiment, a system includes: an automated data storage library which includes: a designated physical mechanism accessible at the automated data storage library, and a memory. The automated data storage library is configured to capture a snapshot of one or more logs in response to the designated physical mechanism being triggered, with a proviso that the designated physical mechanism is triggerable without performing any other preliminary steps. The automated data storage library is also configured to store the snapshot in the memory. Moreover, the designated physical mechanism is a switch or a mechanism that physically moves upon application of a force thereto.

Figure 1:
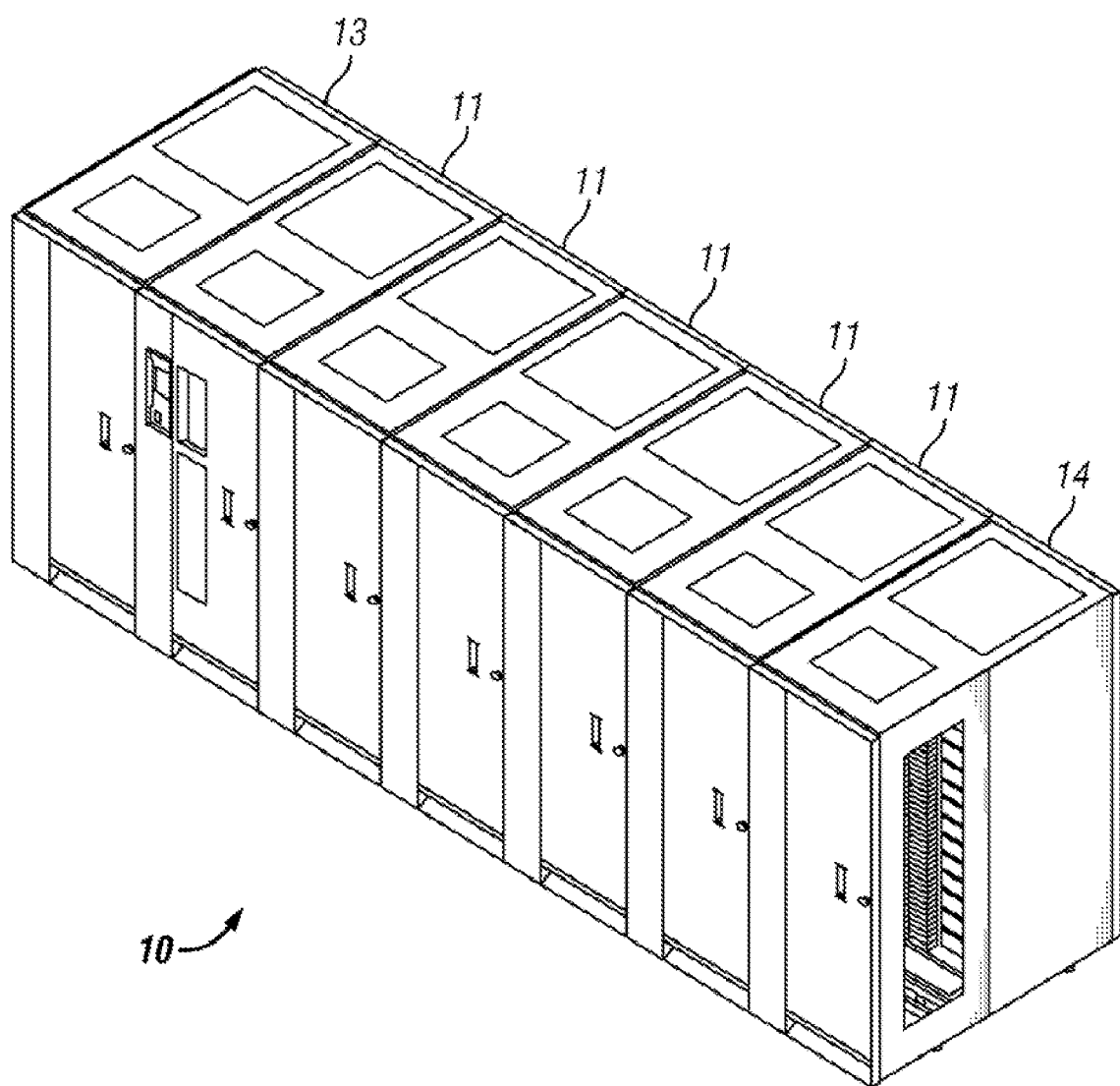
FIG. 1 is a perspective view of an automated data storage library according to one embodiment.
Figure 2:
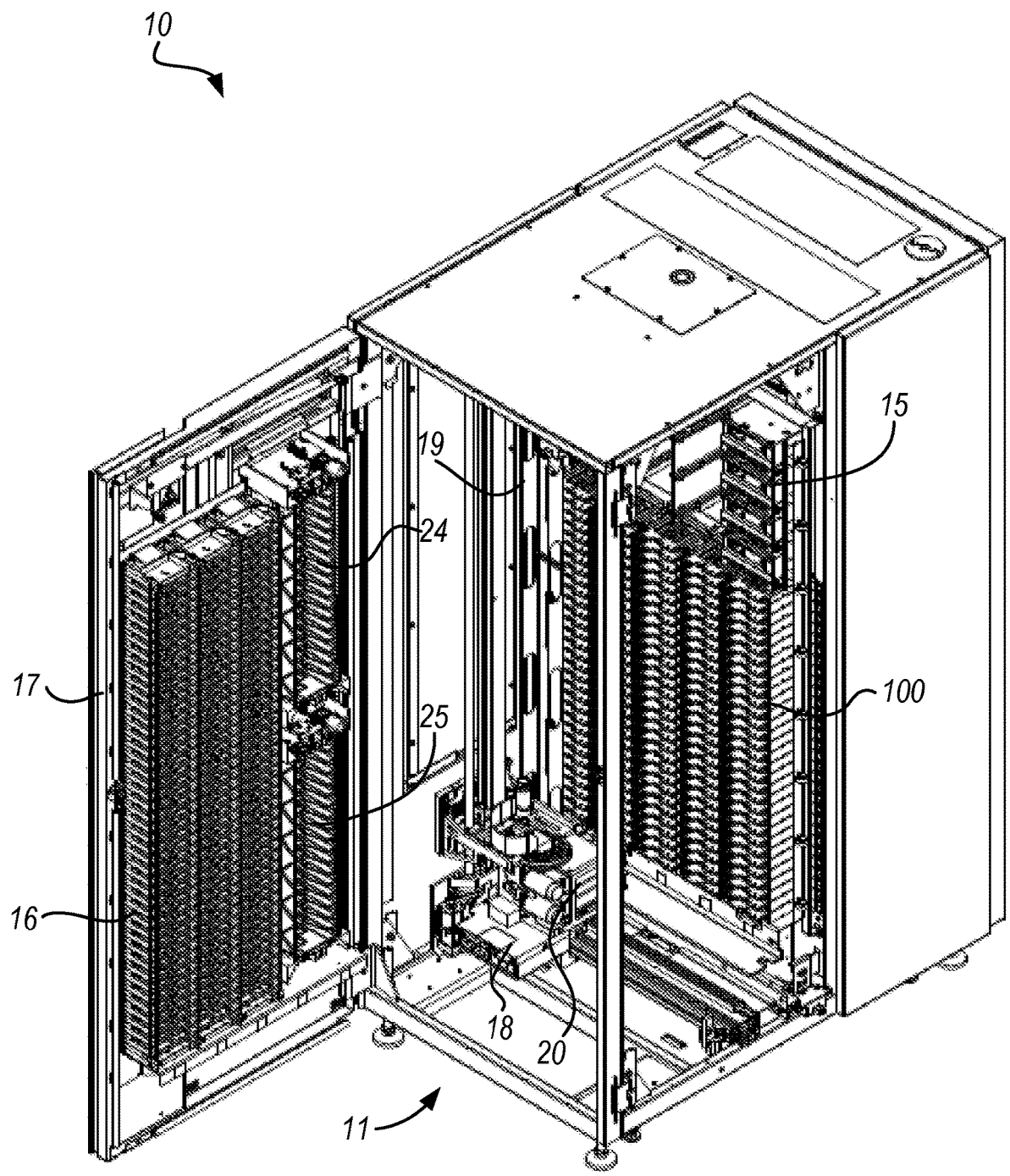
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and/or single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, pass-thru mechanisms, air conditioning units, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or one or more service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disk drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage cartridges, in addition to having a bar code scanner or other reading system, such as a cartridge memory reader or similar system mounted on the gripper assembly 20, to "read" identifying information about the data storage media.

Figure 3:
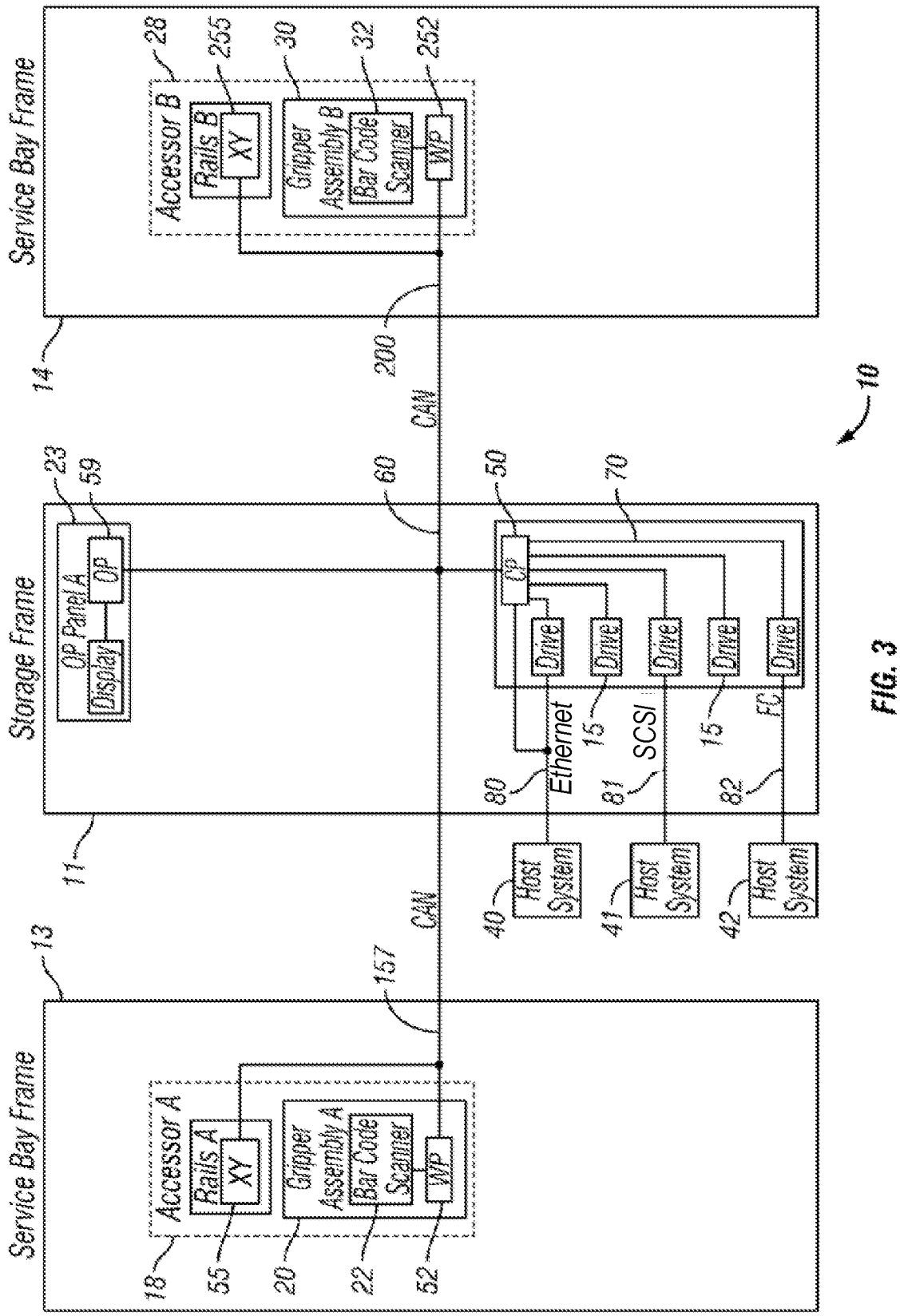
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on input 80, through one or more control ports (not shown), or through one or more data storage drives 15 on inputs 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to input 80.

Still referring to FIG. 3, the communication processor node 50 may additionally provide a communication link, e.g., lines 70, for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host inputs 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
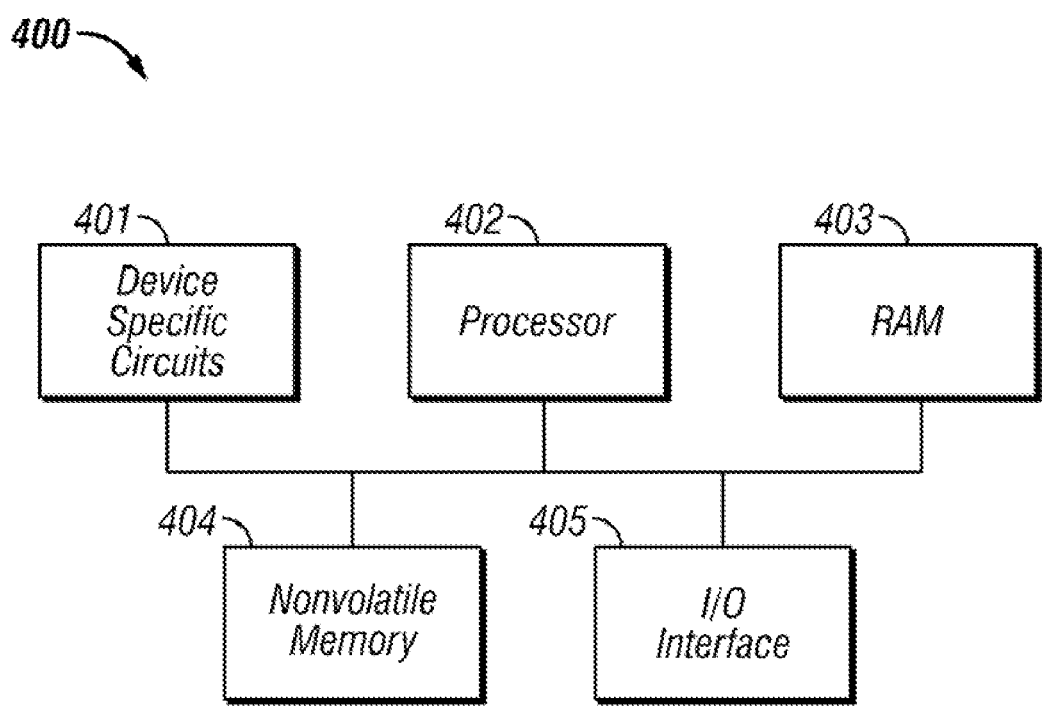
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as Ethernet, RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
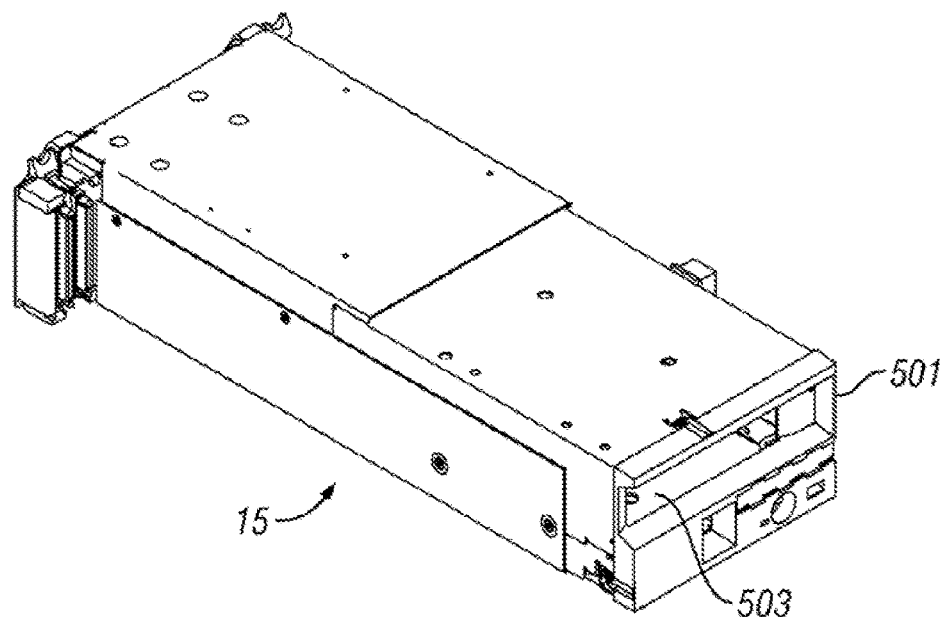
FIG. 5A is a front perspective view of a data storage drive according to one embodiment.
Figure 5B:
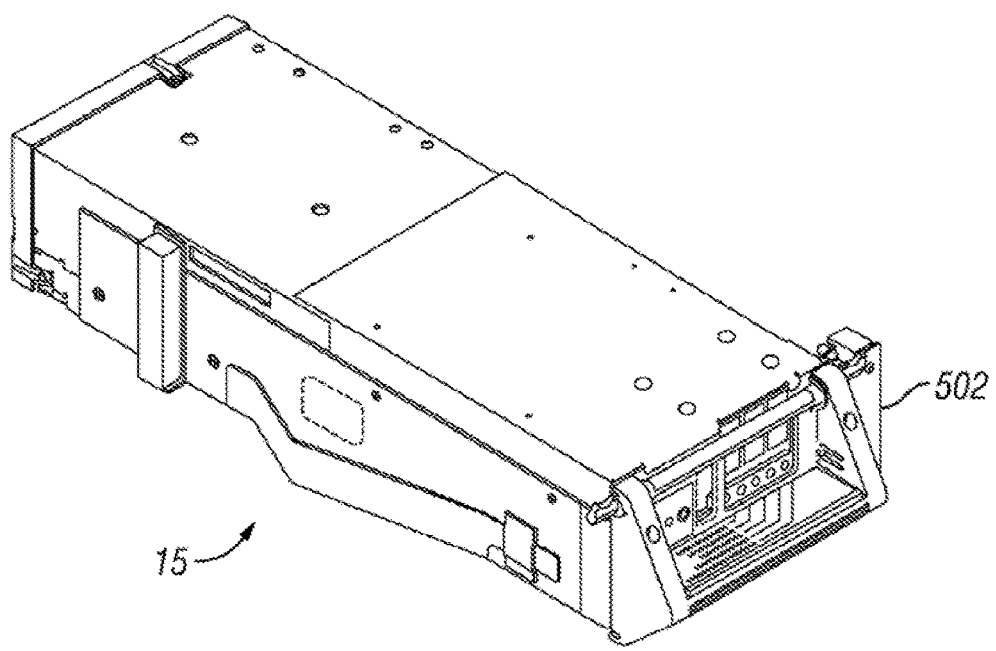
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
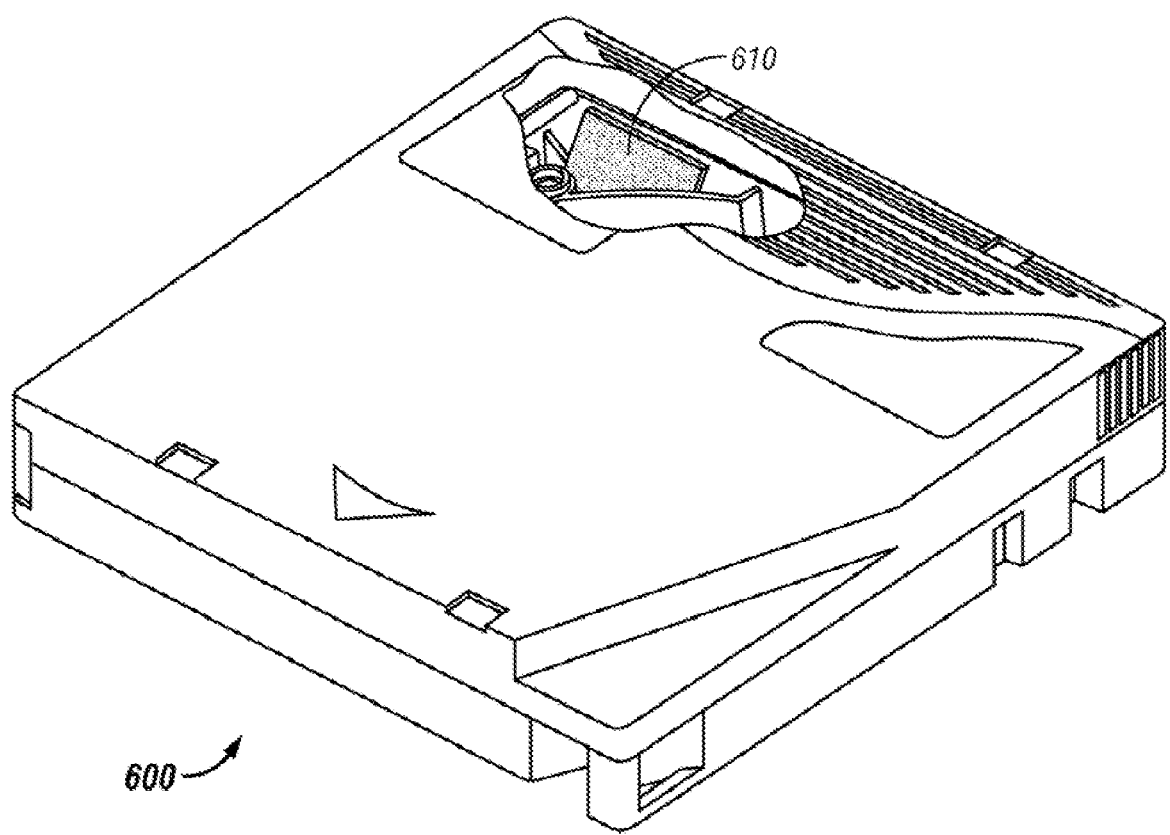
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
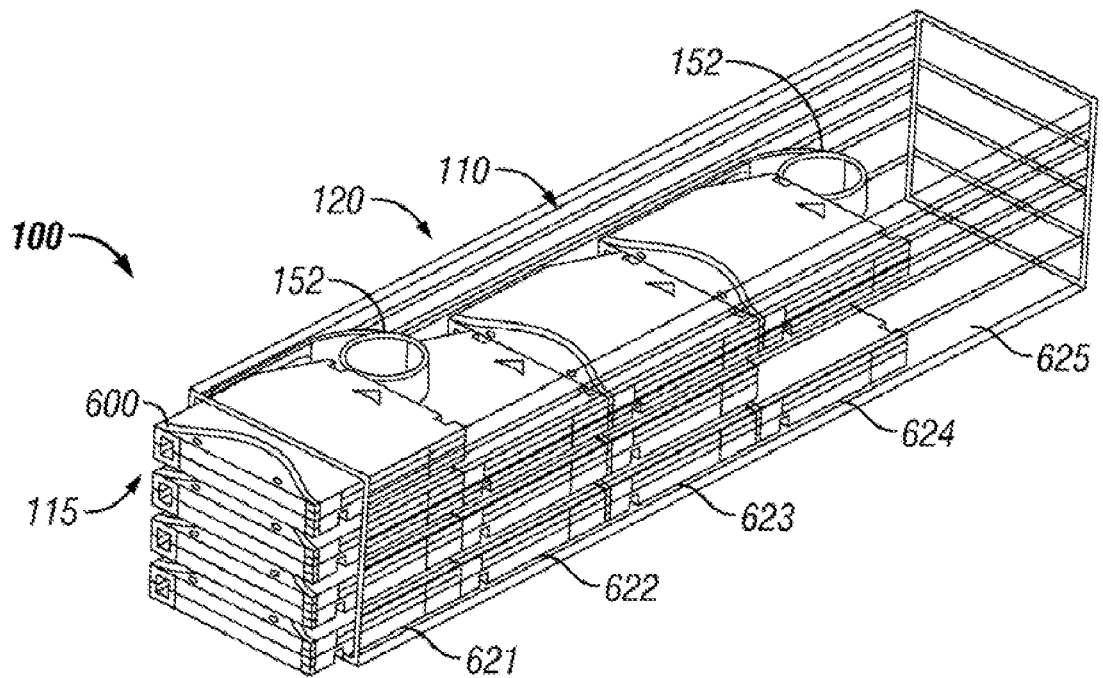
FIGS. 7A-7B are perspective views of a multi-cartridge deep slot cells according to one embodiment.
Figure 7B:
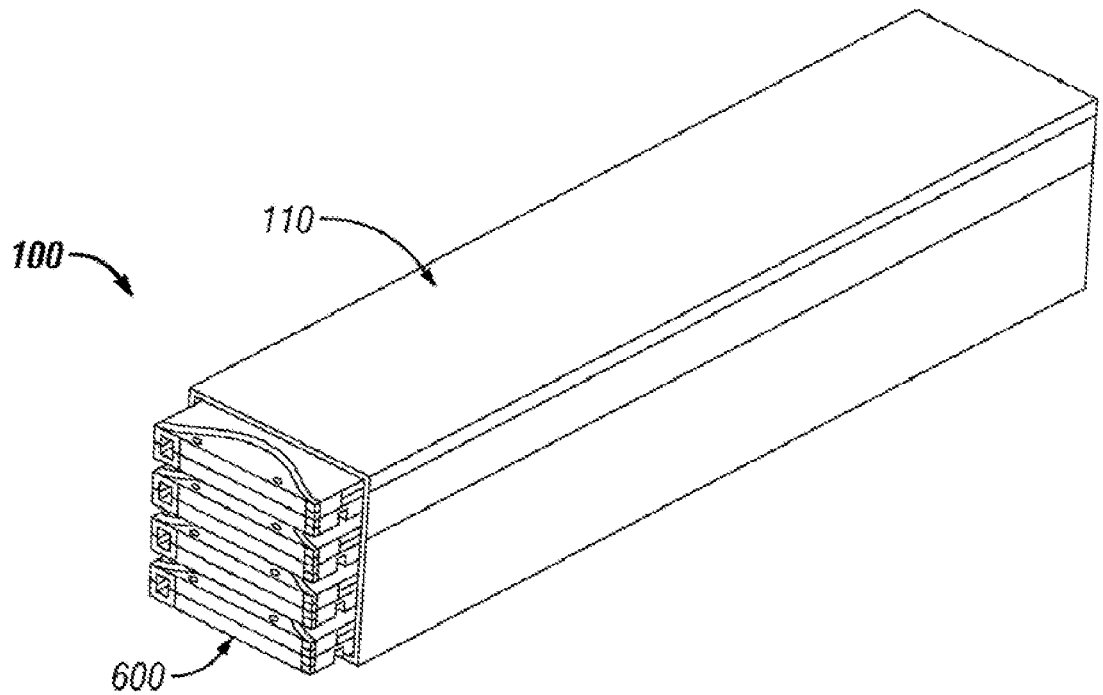

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
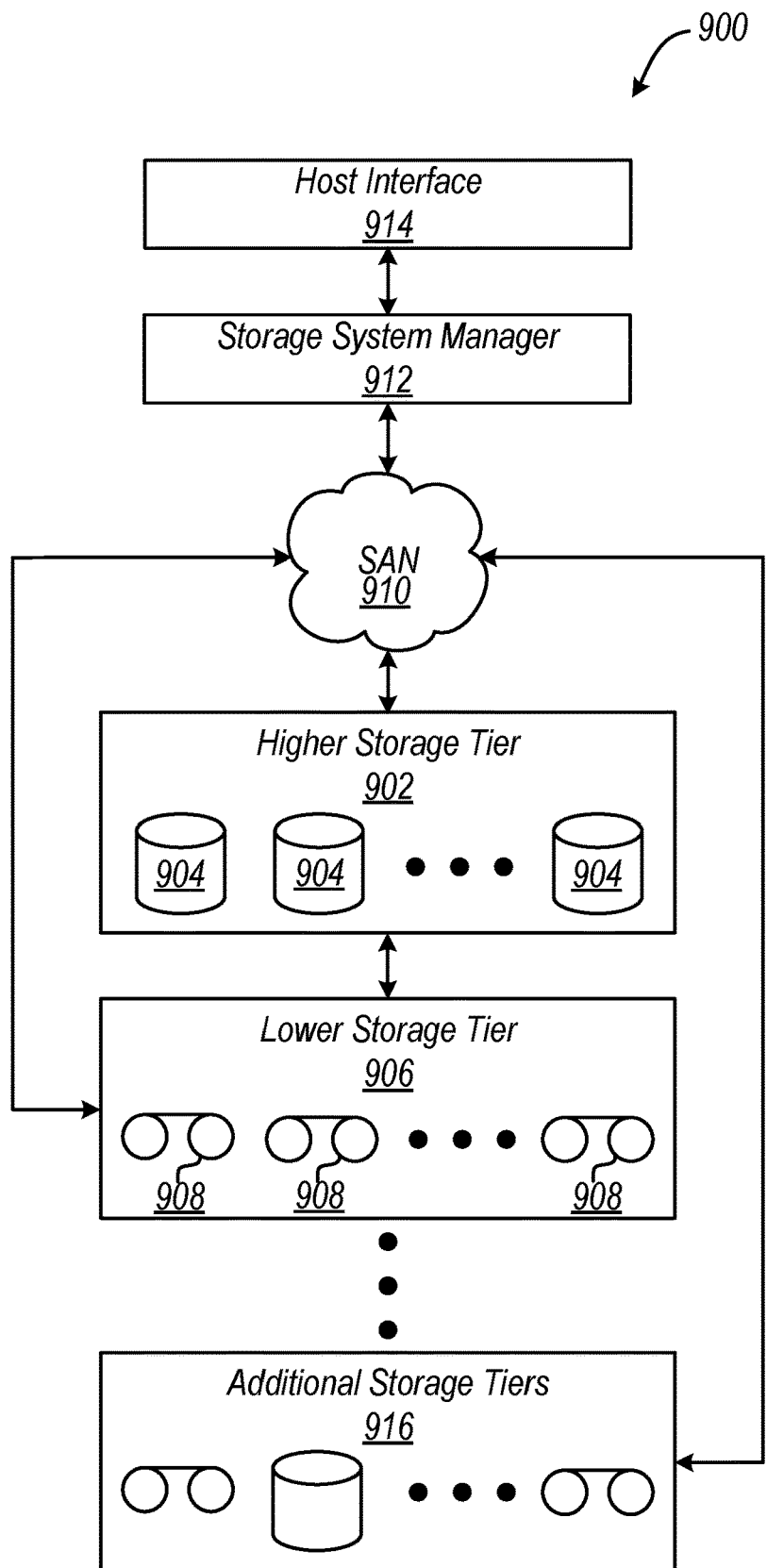
FIG. 9 is a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

As described above, logs may provide diagnostic information related to the operation and failure of automated data storage libraries. For example, when a library encounters a problem, an operator or service technician may use a web user interface on a customer port or a service port to export logs before servicing the product. However, the export and/or capture of logs is often neglected because operators or service technicians are mostly interested in getting the product running as quickly as possible and do not take the time to capture and/or export the logs. If a request is made for these logs (e.g., for a root cause analysis), a time period may have elapsed such that most or all of the information in the logs may have already wrapped causing the data to be lost. In existing storage libraries, logs are typically exported through a user interface (e.g., a web user interface or command line interface). However, the amount of time and effort involved with exporting a log through an existing web user interface can be extremely burdensome. Many times, exporting a log in an existing storage library includes locating a user interface for the library, logging in to that user interface, navigating to a service screen, locating an input that allows for a log to be exported (downloaded), choosing a download location to store the logs, and finally exporting the logs. Accordingly, logs are rarely exported and/or captured for existing storage libraries, particularly in connection with, and at the time of, a service operation.

In sharp contrast, various embodiments described herein may incorporate data storage libraries that are configured to capture and preferably store a snapshot of one or more data logs in direct response to a designated mechanism being triggered. Accordingly, a snapshot of one or more logs is preferably captured before any service actions are performed on the storage library and/or before the relevant data is overwritten.

It should be noted that for the various embodiments described herein, a snapshot may include log information (e.g., log data, data logs, and/or files that contain log data) that may have been frozen (e.g., no longer subject to modification), collected (e.g., gathered together), combined (e.g., concatenated or merged), compressed (e.g., compacted to consume less space), encrypted (e.g., obfuscated), copied (e.g., duplicated), saved (e.g., stored in nonvolatile memory or long term storage), preserved (e.g., write protected, moved to another memory or another area of memory, etc.), organized (e.g., grouped or categorized), sorted (e.g., reordered), etc., contained in one or more logs, files, and/or snapshots. Moreover, the term "capture a snapshot" is intended to refer to the action of creating a snapshot and may include freezing (e.g., stop adding or modifying information to a log or snapshot), collecting (e.g., gathering different logs, files, snapshots, and/or log data), combining (e.g., concatenating files, logs, snapshots, and/or log data), compressing (e.g., compressing files, logs, snapshots, and/or log data), encrypting (e.g., encrypting files, logs, snapshots and/or log data), copying (e.g., copying files, logs, snapshots, and/or log data), saving (e.g., saving files, logs, snapshots, and/or log data), preserving (e.g., preserving files, logs, snapshots, and/or log data), organizing (e.g., organizing files, logs, snapshots, and/or log data), sorting (e.g., sorting files, logs, snapshots, and/or log data), etc., of information contained in one or more logs, files, and/or snapshots. It should also be noted that the information actually included in a snapshot may be preconfigured in some approaches. In other words, when a snapshot is taken, the amount and/or types of logs and information included therein to be captured may be designated (e.g., predetermined) according to a "preconfiguration", depending on the amount of available storage (e.g., memory), the complexity of the overall system, user preferences, whether certain conditions have been met, etc. Moreover, the preconfiguration may be set by a user, set according to a table, set automatically in response to updates to current system conditions, set by firmware or software provided by the manufacturer, etc.

Figure 10:
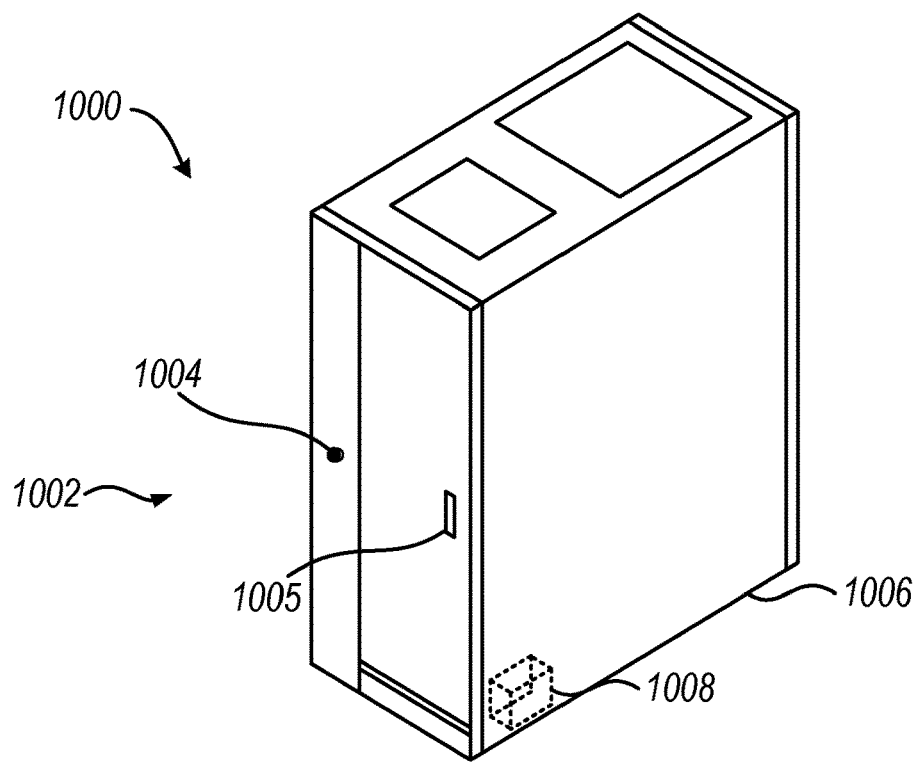
FIG. 10 is a perspective view of a system having an automated data storage library according to one embodiment.

According to some embodiments, the designated mechanism may be a physical mechanism. Referring to FIG. 10, a system 1000 is illustrated in accordance with one embodiment having a designated physical mechanism. As an option, the present system 1000 may be implemented in conjunction with features from any other embodiment listed herein, such as those described with reference to the other FIGS., such as FIGS. 1-2. However, such system 1000 and others presented herein may be used in various applications and/or in permutations which may or may not be specifically described in the illustrative embodiments listed herein. Further, the system 1000 presented herein may be used in any desired environment. Thus FIG. 10 (and the other FIGS.) may be deemed to include any possible permutation.

The system 1000 includes an automated data storage library 1002 having a designated physical mechanism 1004, which may be near door handle 1005. According to various approaches, the designated physical mechanism 1004 may include the following equivalent components: a switch, a push button, a toggle, etc., or any other type of physical mechanism that may be triggered by a physical input (e.g., an external force or touch that physically moves the physical mechanism upon application of a force thereto). The designated physical mechanism may be an optical switch (e.g., a switch that incorporates an emitter and detector that sense an activation of the switch by the presence or absence of a light beam between the emitter and detector), an electrical switch (e.g., a switch that incorporates electrical contacts that open or close an electrical circuit to sense an activation of the switch), a touch switch (e.g., a capacitance touch switch, resistance touch switch, piezo touch switch, etc.) a magnetic switch (e.g., a switch that incorporates a magnet and magnetically activated contacts or a magnetic sensor), etc., or any other form of switch that would be apparent to one of skill in the art upon reading the present description. The library may detect the switch (designated physical mechanism) being triggering through an input on a library processor (e.g., an I/O pin on a microprocessor), a logic circuit (e.g., an FPGA or ASIC), an analog to digital converter (e.g., the analog to digital converter converts a switch voltage to a logic voltage), a communications interface to the library (e.g., the switch includes an I2C or Ethernet interface), etc., or any other method for detecting switch activation through a processor that would be apparent to one of skill in the art upon reading the present description.

Moreover, the designated physical mechanism 1004 may be accessible at an exterior of the automated data storage library 1002. Alternatively, the designated physical mechanism may be accessible at an interior of the automated data storage library 1002 (e.g., behind a door and/or service panel) or it may located on or in another component or device attached to, or associated with, the automated data storage library. As shown in the exemplary embodiment of FIG. 10, the designated physical mechanism 1004 may be a push button which is integrated in an external housing 1006 of the automated data storage library 1002.

The automated data storage library 1002 is preferably configured to capture a log snapshot in direct response to the designated physical mechanism 1004 being triggered. It is preferred that each snapshot is captured immediately following the triggering of the designated physical mechanism 1004, but in some approaches a time delay may be implemented before the snapshot is actually captured. A time delay may be implemented in high throughput situations where the amount of library available processing power is limited.

The information included in a snapshot may vary depending on the desired approach. For instance, the information preferably included in a snapshot may depend on the type of automated data storage library, a type of failure condition experienced, user preference, etc. Rather than having to spend time and effort selecting which data logs to collect, and what information should be included in a given data log at the point when it is requested, it is preferred that a snapshot be captured in response to the designated physical mechanism 1004 being triggered. Thus, the information preferably included in a snapshot may be preset (e.g., predetermined by a user, predetermined by library firmware or software, from a table, a library command, library configuration setting, etc.) and updated accordingly.

Moreover, the designated physical mechanism 1004 may be triggered without performing any other preliminary or subsequent steps, e.g., such as a system login, access verification, library commands, software navigation, data collection prompts, etc. Rather, the designated physical mechanism 1004 may be triggered simply by providing a physical input (e.g., an external force or touch) according to the type of physical mechanism. According to an example, which is in no way intended to limit the invention, an operator or service technician may trigger a push-button designated physical mechanism 1004 by depressing the push-button with his or her finger upon arriving at the storage library 1002. In response, the system may capture a snapshot without requiring any further action, e.g., such as a system login, access verification, library commands, software navigation, data collection prompts, etc., as mentioned above.

In some approaches, the designated physical mechanism may have a single function of capturing a snapshot upon being triggered as described above. However, in other approaches, the physical mechanism may have multiple functionalities. A physical mechanism may capture a snapshot in response to being triggered in a first way, and the physical mechanism may initiate a different action in response to being triggered in a second (different) way, and so on. According to an example, which is in no way intended to limit the invention, the designated physical mechanism may be a push button configured to capture a snapshot in response to being triggered (pushed) and immediately returned to a resting state (released). However, the same designated physical mechanism may cause the automated data storage library to pause all operations (e.g., cause the automated accessors therein to pause all movement) upon being triggered and kept in a triggered position (e.g., by pushing and holding down the push button for five seconds). Thus, a service technician or operator may trigger the designated physical mechanism and immediately returned to a resting state to capture a snapshot, and then trigger the same designated physical mechanism and keep it triggered in order to pause the automated accessors in the library, e.g., such that the service technician may enter the library and perform work therein without the risk of coming into contact with a moving automated accessor. Alternatively, the dual use button may provide both functions without requiring two different states of the designated physical mechanism 1004. For example, triggering a push button may cause the automated storage library to be paused in addition to causing a snapshot to be captured.

In different embodiments, the captured snapshot may include trace information (e.g., information related to what the library, drive, another component and/or device, etc., was doing), diagnostic information (e.g., information related to problems and/or errors that may have been encountered by the library, drive, another component and/or device, etc.), statistical information (e.g., information related to the performance and/or usage of various elements of the library, drive, another component and/or device, etc.), configuration information (e.g., information related to settings and preferences of the library, drive, another component and/or device, etc.), backup information (e.g., a backup of the state, settings, and/or configuration of the library, drive, another component and/or device, etc.), database information (e.g., information related to any databases of the library, drive, another component and/or device, etc.), etc., or any other desired information. As mentioned above, a preconfiguration may be used to designate the amount and/or types of logs and/or log information included in a snapshot to be captured in response to the designated physical mechanism 1004 being triggered. Moreover, the preconfiguration may be selected depending on the amount of available storage (e.g., memory), the complexity of the overall system, user preferences, whether certain conditions have been meet, etc.

It should be noted that the automated data storage library 1002 in FIG. 10 is described herein as being a magnetic tape library. However, in other embodiments, the automated data storage library 1002 may include any type of media on which data may be stored and which may serve as removable media, such as magnetic media (e.g., magnetic disks), optical media (e.g., optical tape or disks), electronic media (e.g., PROM, EEPROM, flash PROM, CompactFlash™, Smartmedia™, Memory Stick™, etc.), etc., or other suitable types of media. It should also be noted that although the automated data storage library 1002 is only illustrated as including one storage frame, a storage library as used herein may include any number of storage frames or expansion modules. In some approaches, the automated data storage library 1002 may include more than one storage frame and/or one or more service bays (e.g., see service bays 13, 14 and storage frames 11 of FIG. 1). Thus, triggering a designated physical mechanism 1004 may result in more than one snapshot being captured, e.g., depending on the number of storage frames and/or service bays included in the automated data storage library 1002. In addition, snapshots (e.g., logs or log data) may be captured from any components or processors associated with the automated data storage library (e.g., drive logs, encryption key server logs, library logs for each of the nodes in a distributed control system, etc.) and may be included in a snapshot according to some approaches.

With continued reference to FIG. 10, the system 1000 further includes memory 1008. The automated data storage library 1002 is preferably configured to store the snapshot in the memory 1008. According to one approach, the snapshot may be stored in a separate (e.g., protected) portion of the memory 1008.

Memory 1008 may be of any type of volatile or nonvolatile memory according to the desired approach, e.g., such as compact Flash, a hard drive, RAM, etc. While any type of memory configuration may be used, in one exemplary approach, which is in no way intended to limit the invention, the area (portion) of memory 1008 that stores log snapshots may be configured as a circular buffer. Herein, a circular buffer may be a physical arrangement (e.g., sequential memory that wraps back upon itself) or it may be a logical arrangement (e.g., a group of files stored in different areas of memory on a storage medium but ordered by some criteria such as the date/time that the file was stored). Accordingly, the circular buffer may be configured to store a maximum number of snapshots. Upon reaching the maximum number of snapshots stored in the circular buffer memory, the library may be configured to overwrite a selected snapshot stored therein with a new snapshot in a first-in-first-out (FIFO) manner. However, in other approaches the memory may overwrite a selected snapshot stored therein with a new snapshot in a different manner, e.g., such as a last-in-first-out (LIFO) manner, or based on some other criteria. Memory 1008 may be located on a library controller, on one or more nodes of a library distributed control system, as an independent component of the library, external to the library (e.g., a remote server, on cloud storage, a networked attached storage device, etc.), etc., depending on the desired embodiment. In addition, the snapshots may be stored in multiple locations. For example, they may first reside in RAM and after the designated physical mechanism has been triggered they may be stored in a nonvolatile memory (e.g., a hard drive).

According to some approaches, the system 1000 may limit the number of snapshots that may be captured in a given amount of time, e.g., in response to repeated triggering of the designated mechanism in succession. Implementing such a limit may assist in ensuring the automated data storage library 1002 does not exert an undesirable amount of processing power or storage capacity to capture a large number of the same snapshots within a given amount of time. This is particularly true when the window of time is sufficiently small, as capturing multiple versions of the same snapshot within a sufficiently small window of time would be essentially redundant, thereby resulting in an undesirable exertion of system bandwidth. According to an example, which is in no way intended to limit the invention, the system 1000 may limit the number of times the snapshots may be captured in a given amount of time. For example, a limit specifying that no more than one snapshot may be captured within any one hour period may be implemented.

The automated data storage library 1002 may further be configured to transmit the snapshot to a remote location that is not within the automated data storage library 1002 itself, e.g., to a computer on site but outside the data storage library 1002, a computer at a remote geographical location, a support provider's system, a cloud-based database, etc. The snapshot may be transmitted to the remote location using an antenna (not shown), a local area network connection, an internet connection, etc. Depending on the approach, a snapshot may be transmitted to a remote location in addition to, or in place of, saving the snapshot to the memory 1008. In some approaches, a snapshot may be transmitted to (e.g., and stored at) a remote location in response to determining that the amount of information stored in memory 1008 is above a threshold (e.g., is full), or an equivalent determination, e.g., such as whether the amount of information stored in memory 1008 is within a predetermined range, outside a predetermined range, below a threshold, etc., depending on the desired approach. However, as mentioned above, in some approaches snapshots may be sent to a remote location in addition to being saved to the memory 1008, e.g., for redundancy, for root cause analysis, for remote support, for additional processing, to inform a user, to open a problem ticket, etc. According to one approach, snapshots may be transmitted to (e.g., and stored at) a support center at a remote location in response to determining that a certain problem is at issue, when a user has this functionality enabled (e.g., when a user pays for this functionality, when the product is under warranty, etc.), etc.

In other approaches, the memory 1008 may be located at a remote location within the system 1000, e.g., in the system 1000 but outside the automated data storage library 1002. Thus, snapshots may be transmitted to the memory 1008 at a "remote location", although the memory 1008 is still located in the system 1000.

As described above, e.g., with reference to FIG. 10, a designated physical mechanism (e.g., a push-button) may be added to an automated data storage library, and the library may be configured to capture a snapshot of one or more data logs (e.g., for later retrieval and/or export) in response to a designated physical mechanism being triggered. According to an in-use example, which is in no way intended to limit the invention, when an operator or service technician arrives at an automated data storage library to service the library, the operator may simply trigger (e.g., press) the designated physical mechanism in order to cause the library to capture a snapshot for later retrieval (e.g., export). As a result, first time data capture is enabled, as the snapshot may be captured before any service actions are performed (e.g., which may otherwise mask the original error) and/or before enough time has elapsed to cause the data logs to wrap, thereby overwriting information about a condition (e.g., error) corresponding to the operator performing work on the automated data storage library due to the finite amount of memory available to store such data.

Again, triggering the designated physical mechanism preferably causes a snapshot of one or more data logs to be captured and/or stored for later retrieval (e.g., export). In some approaches, the snapshot may be used to perform complex repairs that may involve additional support from a third party (e.g., a support center or development team). In other approaches, the snapshot may be used to determine root cause analysis in an effort to eventually improve the product hardware and/or firmware of a given embodiment, e.g., as would be appreciated by one skilled in the art upon reading the present description.

As described above, in some embodiments the designated mechanism may be a physical mechanism (e.g., see 1004 of FIG. 10). However, in other embodiments, the designated mechanism may be a logical mechanism, such as a logical button on an operator panel touchscreen, and may be nearly as readily available as the designated physical mechanism of FIG. 10. In other words, a designated logical mechanism is preferably readily accessible at an exterior of the automated data storage library, as will be discussed in further detail below.

Figure 11:
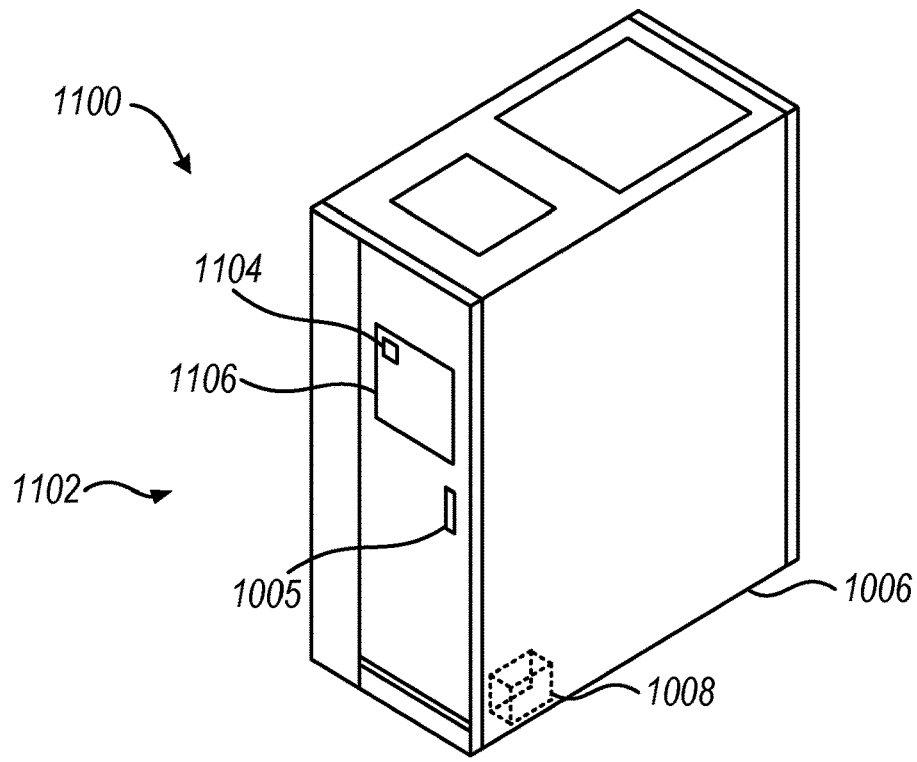
FIG. 11 is a perspective view of a system having an automated data storage library according to one embodiment.

Looking to FIG. 11, a system 1100 is illustrated in accordance with one embodiment having a designated logical mechanism. As an option, the present system 1100 may be implemented in conjunction with features from any other embodiment listed herein, such as those described with reference to the other FIGS., such as FIG. 10. Specifically, FIG. 11 illustrates variations of the embodiment of FIG. 10 depicting exemplary configurations within a system 1100. Accordingly, various components of FIG. 11 have common numbering with those of FIG. 10.

However, such system 1100 and others presented herein may be used in various applications and/or in permutations which may or may not be specifically described in the illustrative embodiments listed herein. Further, the system 1100 presented herein may be used in any desired environment. Thus FIG. 11 (and the other FIGS.) may be deemed to include any possible permutation.

The system 1100 includes an automated data storage library 1102 having a designated logical mechanism 1104 on a display device 1106, which may be located in a convenient location such as next to door handle 1005. According to one approach, the designated logical mechanism 1104 may be a logical button (e.g., a "capture snapshot" button) presented on a resting page (e.g., a login page) of the display device 1106 (e.g., monitor, graphical user interface (GUI), etc.) which may be selected using a cursor, a stylus, finger, mouse, trackball, touchpad, etc. or another accessory used with a touchscreen monitor or a monitor and keyboard (or other computer input device). In other approaches, the designated logical mechanism 1104 may be an input command prompt, a logical switch, keyboard, etc., or any other type of logical mechanism on the display device 1106 that may be triggered by a logical input.

As described above, the designated logical mechanism may have a single function of capturing a snapshot of one or more data logs upon being triggered. However, in other approaches, the logical mechanism may have dual functionality, or higher. According to an example, the designated logical mechanism may be a persistent logical button (e.g., a "service" button that sits in the upper left hand corner of every page on a display). The button may initiate the capture of a snapshot and may also pause the library in response to a user selecting the button.

The display device 1106 is preferably accessible at an exterior of the automated data storage library 1102, thereby making the designated logical mechanism 1104 accessible at an exterior of the automated data storage library 1102 as well. Alternatively, the display device may be accessible at an interior of the automated data storage library 1102 (e.g., behind a door or service panel) or it may located on or in another component or device attached to, or associated with, the automated data storage library. As shown in the exemplary embodiment of FIG. 11, the designated logical mechanism 1104 may be a logical button presented (e.g., displayed) on the display device 1106, where the display device 1106 is integrated in external housing 1006 of the automated data storage library 1102. Thus, the designated logical mechanism 1104 may be as readily available as the designated physical mechanism 1004 described above. In other words, the designated logical mechanism 1104 may be located "front and center" at an exterior of the automated data storage library 1102 (e.g., on a GUI), and may be accessed (triggered) without first providing a username and/or password to log into the data storage library 1102, without navigating menus and/or screens, without first selecting any data log download options, without choosing where the data logs are to be saved, etc. Thus, the data storage library 1102 is preferably configured to capture one or more snapshots in direct response to the designated logical mechanism 1104 being triggered.

As described above, in response to the designated logical mechanism 1104 being triggered, the system 1100 may capture a snapshot without requiring any further action, e.g., such as a system login, access verification, library commands, software navigation, data collection prompts, etc., as mentioned above. In different embodiments, the set of information included in a snapshot may be preconfigured by a user, an administrator, a system manager, etc., to include trace information, diagnostic information, statistical information, configuration information, backup information (e.g., a backup of the library configuration), database information, etc., or any other desired information. The amount and/or types of data logs and/or information preconfigured in a specified snapshot in response to the designated logical mechanism 1104 being triggered may be selected depending on the amount of available storage (e.g., memory), the complexity of the overall system, user preferences, whether certain conditions have been meet, etc.

With continued reference to FIG. 11, the system 1100 further includes memory 1008. The automated data storage library 1102 is preferably configured to store the snapshot in the memory 1008. As mentioned above, memory 1008 may be of any type according to the desired approach. In one exemplary approach, which is in no way intended to limit the invention, the memory 1008 may be configured as a circular buffer. Accordingly, the circular buffer may be configured to store a maximum number of snapshots. Upon reaching the maximum number of snapshots stored in the circular buffer memory, the library may be configured to overwrite a selected snapshot stored therein with a new snapshot in a FIFO manner, in a LIFO manner, or based on some other criteria, etc., depending on the desired embodiment. Moreover, according to some approaches, the system 1100 may limit the number of snapshots in a given amount of time, e.g., as previously described. Memory 1008 may be located on a library controller, on one or more nodes of a library distributed control system, as an independent component of the library, external to the library (e.g., a remote server, on cloud storage, a networked attached storage device, etc.), etc., depending on the desired embodiment. In addition, the snapshots may be stored in multiple locations. For example, they may first reside in RAM and after the designated logical mechanism has been triggered they may be stored in a nonvolatile memory (e.g., a hard drive).

The automated data storage library 1102 may further be configured to transmit the snapshot to a remote location, e.g., using an antenna (not shown), a local area network connection, an internet connection, etc. The snapshot may be transmitted to a remote location in addition to, or in place of, saving the snapshot to the memory 1008, e.g., according to any of the approaches described above with reference to FIG. 10, and/or their combination. Thus, in some approaches, a snapshot may be transmitted to, and/or stored at, a remote location in response to determining that the amount of information stored in memory 1008 is above a threshold (e.g., is full), or an equivalent determination. However, in other approaches, snapshots may be sent to a remote location in addition to being saved to the memory 1008, e.g., for redundancy, for additional processing, to inform a user, etc. In still other approaches, the memory 1008 may be located at a remote location within the system 1000, e.g., in the system 1000 but outside the automated data storage library 1002. Thus, snapshots may be transmitted to the memory 1008 at a "remote location", although the memory 1008 is still located in the system 1000.

By incorporating designated physical and/or logical mechanisms with an automated data storage library, an operator or service technician may be able to directly instruct the library to capture a snapshot of one or more data logs (e.g., for later retrieval and/or export) by simply triggering the designated mechanism. Thus, a designated physical and/or logical mechanism may be triggered, to capture a snapshot of one or more data logs, without requiring the user to perform any other preliminary and/or subsequent steps, e.g., such as performing a system login, access verification, library commands, software navigation, data collection prompts, etc. Rather, the designated physical and/or logical mechanism may be triggered simply by providing an appropriate input (e.g., an external force, logical response, etc.) according to the type of mechanism.

According to an in-use example, which is in no way intended to limit the invention, when a user arrives at an automated data storage library to inspect the library, the user may simply trigger (e.g., activate) a designated physical and/or logical mechanism in order to cause the library to capture a snapshot of one or more data logs (e.g., for later retrieval and/or export) upon arriving at the storage library. As a result, the snapshot may be captured even before any inspection actions are performed and/or before enough time has elapsed to cause the data logs to wrap, thereby overwriting information about a condition of the storage library when the inspection was performed.

Again, triggering the designated physical mechanism preferably causes a snapshot to be captured for later retrieval (export). In some approaches, the snapshot may be used to perform complex analysis, repairs, predictions, etc., that may involve additional support from a third party (e.g., a support center or a development team). In other approaches, the snapshot may be used to determine root cause analysis in an effort to eventually improve the product hardware and/or firmware of a given embodiment, e.g., as would be appreciated by one skilled in the art upon reading the present description.

Figure 12:
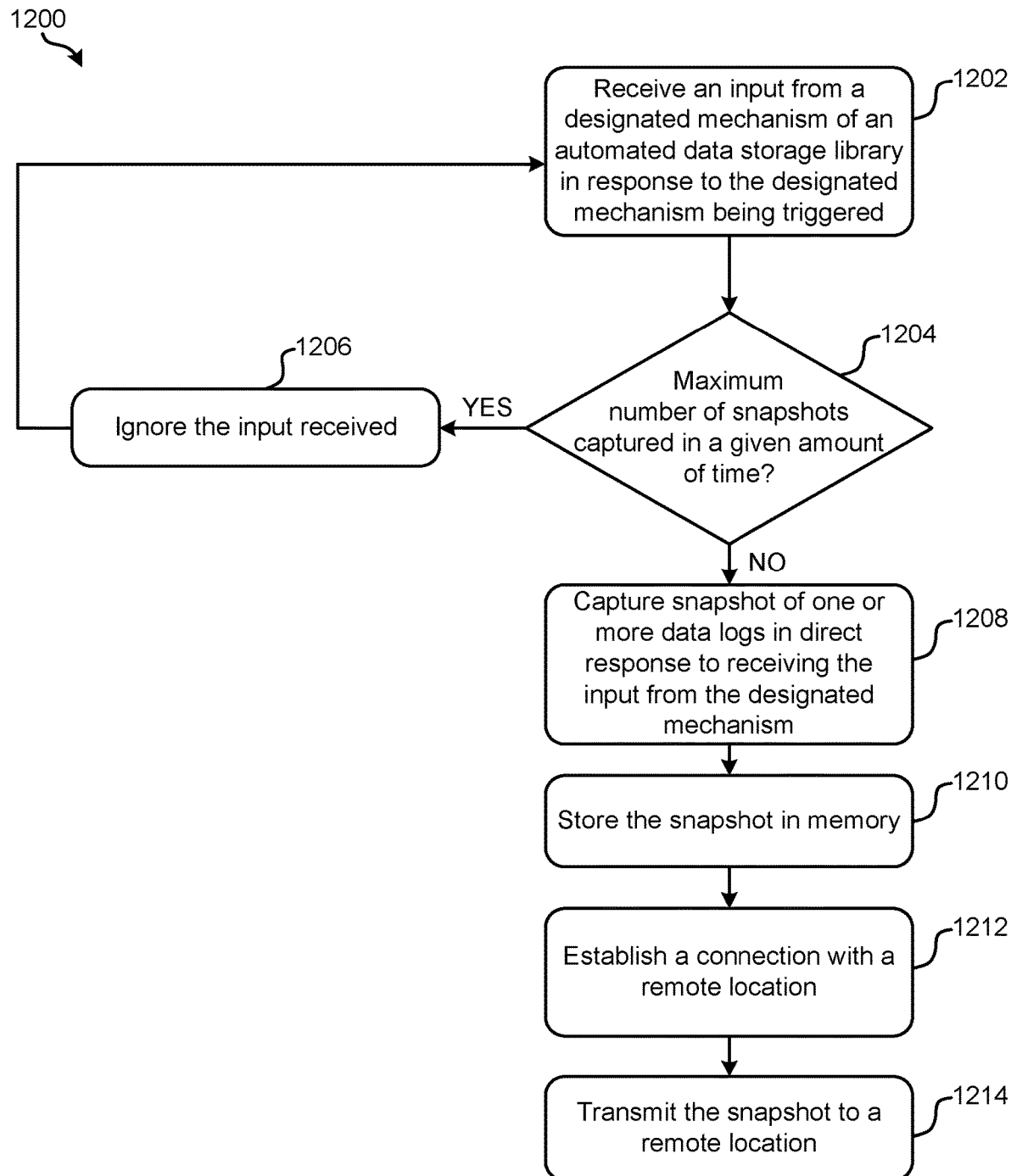
FIG. 12 is a flowchart of a method according to one embodiment.

Now referring to FIG. 12, a flowchart of a method 1200 is shown according to one embodiment. The method 1200 may be performed in accordance with the present invention in any of the environments depicted in FIGS. 10-11, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), a digital signal processor (DSP), an application specific integrated circuit (ASIC), a field programmable gate array (FPGA), etc., combinations thereof, or any other suitable computing device known in the art.

As shown in FIG. 12, method 1200 includes receiving an input from a designated mechanism of an automated data storage library in response to the designated mechanism being triggered. See operation 1202. As mentioned above, the designated mechanism may be a physical or logical mechanism. Moreover, the designated mechanism is preferably located at an exterior of the storage library, e.g., such that the designated mechanism is integrated in the exterior housing of the automated data storage library. Alternatively, the designated mechanism may be located behind a door or service panel, or it may located on or in another component or device attached to, or associated with, the automated data storage library. According to one approach, a designated physical mechanism may be a physical push button integrated in a housing of the automated data storage library. According to another approach, a designated logical mechanism is a logical button on a screen (GUI) integrated in a housing of the automated data storage library.

As described herein, it is preferred that the designated mechanism may be triggered, e.g., by a user, without requiring the user to perform any other preliminary steps such as performing a system login, access verification, library commands, software navigation, data collection prompts, etc. Rather, the designated physical and/or logical mechanism may be triggered simply by providing an appropriate input (e.g., an external force, logical response, etc.) according to the type of mechanism.

Referring still to method 1200, optional decision 1204 includes determining whether a maximum number of snapshots have been captured in a given amount of time, e.g., in response to repeated triggering of the designated physical and/or logical mechanism. Again, it may be desirable in some approaches that the number of snapshots captured during a given period of time are limited, e.g., in a five minute period, ten minute period, a half hour period, etc., depending on the desired approach, e.g., according to any of the approaches described above. Implementing such a limit may assist in ensuring an automated data storage library does not exert an undesirable amount of processing power to capture an unnecessarily large number of snapshots within a given amount of time. This is particularly true when the window of time is sufficiently small as capturing multiple snapshots within a sufficiently small window of time would be essentially redundant, thereby resulting in an undesirable exertion of system bandwidth or storage.

Looking to operation 1206, method 1200 includes ignoring the input received upon determining that a maximum number of snapshots have been captured for a given period (amount) of time. Method 1200 may then return to operation 1202 and wait to receive another input from the designated mechanism in response to the designated mechanism being triggered again. Alternatively, operation 1206 may implement a time delay before performing decision 1204 again (not shown), e.g., to determine whether a sufficient amount of time has passed such that another snapshot may be captured. In some approaches, this process of implementing a predetermined time delay between each time decision 1204 is performed may be repeated until it is determined that a maximum number of snapshots have not been captured for a given period of time.

Operation 1208 includes capturing one or more snapshots of one or more data logs. In preferred approaches, operation 1208 is performed in direct response to receiving the input from the designated mechanism. Thus, although method 1200 illustrates decision 1204 as being a process between receiving the input from the designated mechanism and actually capturing the one or more snapshots of one or more data logs, in some approaches, decision 1204 may not be performed (e.g., when the storage library is first used). In other approaches, operation 1208 is performed in direct response to receiving the input from the designated mechanism upon determining that a maximum number of snapshots have not been captured for a given period (amount) of time.

The snapshot may include a preconfigured (e.g., predetermined) set of information to be captured. In different embodiments, the set of information included in a snapshot may include trace information (e.g., information related to what the library, drive, another component and/or device, etc., was doing), diagnostic information (e.g., information related to problems and/or errors that may have been encountered by the library, drive, another component and/or device, etc.), statistical information (e.g., information related to the performance and/or usage of various elements of the library, drive, another component and/or device, etc.), configuration information (e.g., information related to settings and preferences of the library, drive, another component and/or device, etc.), backup information (e.g., a backup of the state, settings, and/or configuration of the library, drive, another component and/or device, etc.), database information (e.g., information related to any databases that the library, drive, another component and/or device, etc. may have), etc., or any other desired information. Moreover, as previously mentioned, the amount and/or types of data logs and/or information preconfigured to be captured in a snapshot may be selected based on the amount of available storage (e.g., memory), the complexity of the overall system, user preferences, whether certain conditions have been meet, etc. Thus, the information preferably included in a snapshot for a given approach may be preset (e.g., by a user) and updated accordingly. Alternatively, the information included in a snapshot may be determined by library firmware or software.

Figure 13:
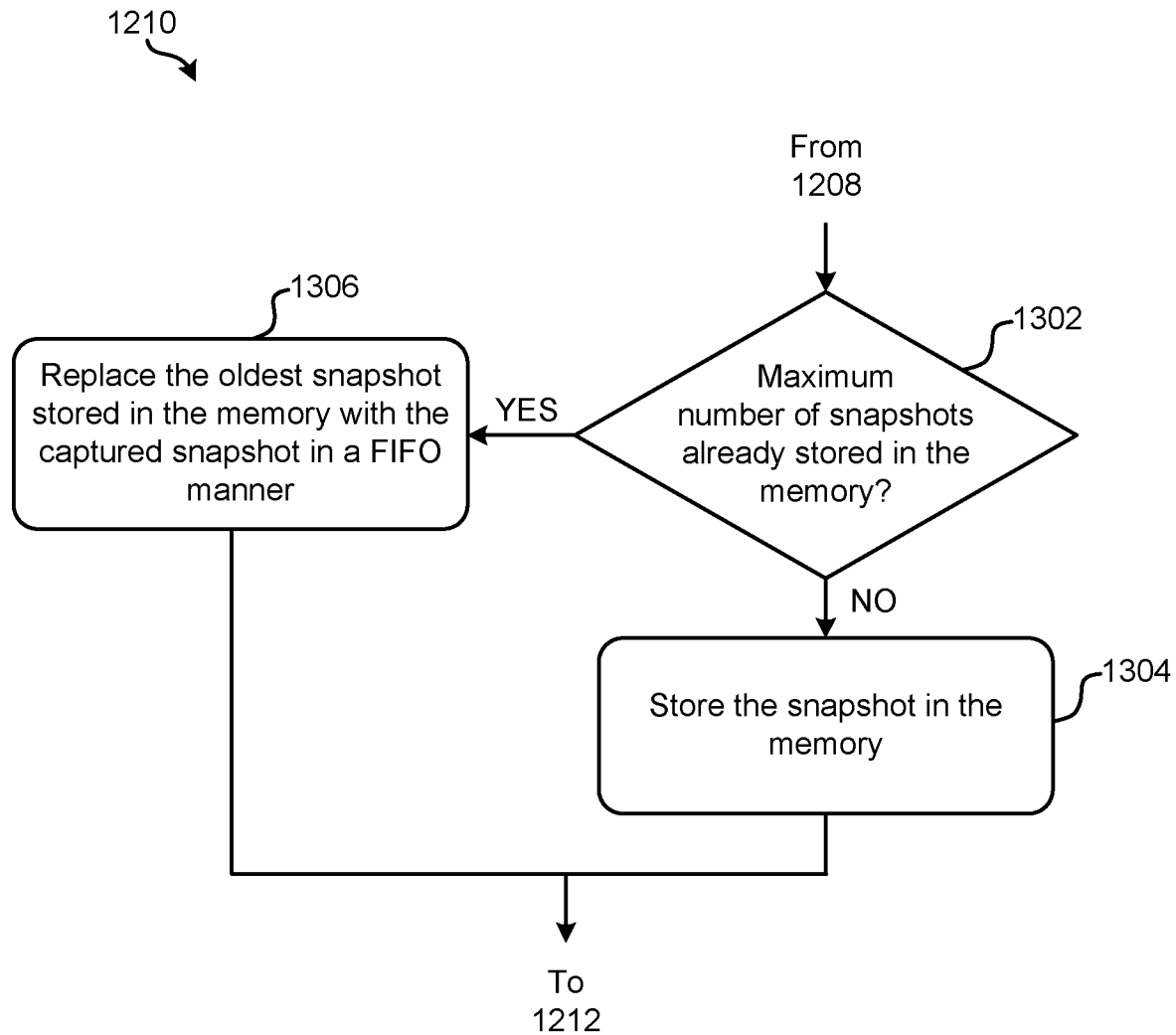
FIG. 13 is a flowchart of sub-operations for the method in FIG. 12.

Furthermore, operation 1210 includes storing the snapshot in memory. As mentioned above, the memory may be configured as a circular buffer in some approaches. Accordingly, upon reaching the maximum number of snapshots stored in the circular buffer memory (or simply the maximum number of snapshots allowed under a rule enforced by the library), the library may be configured to overwrite a selected snapshot stored therein with a new snapshot in a manner as depicted in FIG. 13. In other words, performing operation 1210 may include any one or more of the sub-operations of FIG. 13.

As shown, sub-operation 1302 includes determining whether a total amount of snapshots stored in the automated data storage library exceeds a threshold. In other words, sub-operation 1302 includes determining whether a maximum number of snapshots have already been stored in the memory (e.g., circular buffer). The threshold may be predetermined by a user, set according to a lookup table, automatically set based on system settings, based on a limit set in the library firmware or software, etc. Moreover, it should be noted that "above a threshold" is in no way intended to limit the invention. Rather than determining whether a value is above a threshold, equivalent determinations may be made, e.g., as to whether a value is within a predetermined range, whether a value is outside a predetermined range, whether an absolute value is above a threshold, whether a value is below a threshold, etc., depending on the desired approach.

Referring still to FIG. 13, sub-operation 1304 includes storing the snapshot in the memory (e.g., circular buffer) in response to determining that a total amount of snapshots stored in the automated data storage library does not exceed a threshold (e.g., that the maximum number of snapshots have not been stored therein).

However, optional sub-operation 1306 includes overwriting a selected stored snapshot (e.g., the oldest snapshot) stored in the automated data storage library (e.g., in the memory which may be configured as a circular buffer) with the newly captured snapshot in response to determining that the total amount of snapshots stored in the automated data storage library exceeds the threshold. This replacement may be performed in a FIFO manner, or according to any of the approaches described above. Upon completing sub-operation 1304 or 1306, the flow of FIG. 13 may return to method 1200 of FIG. 12 as shown.

In one embodiment, a selected snapshot (a snapshot that was previously stored) may be overwritten by a newly captured snapshot. A snapshot may be selected for overwriting or replacement if it is the oldest, or an older (e.g., one of the oldest 5%) snapshot of those stored. This may be desired when older snapshots are considered less relevant due to their age. For instance, when someone has not exported older snapshots for a given amount of time since they were originally captured, then they may not necessarily be needed, e.g., at least in comparison to one or more newly captured snapshots. Alternatively, a snapshot may be selected for overwriting or replacement if it is the newest, or a newer (e.g., one of the newest 5%) snapshot of those stored. This may be desired when newer snapshots are considered less relevant because the new snapshot may encompass essentially the same information as a snapshot recently captured and already stored in memory. For instance, two snapshots of the same one or more data logs taken back-to-back may not be significantly different. Still further, there may be some other criteria for selecting which snapshot is overwritten in a given instance.

Overwriting a snapshot may include a direct overwrite. Alternatively, overwriting a snapshot may include a modification (e.g., adding, replacing, erasing or removing one or more files, logs, snapshots, log data, etc.). In other approaches, overwriting a snapshot may include erasing a previous snapshot and then storing the new snapshot. Still further, overwriting a snapshot may include storing the new snapshot and then erasing a previous snapshot. As described herein, overwriting a snapshot preferably refers to writing over an older snapshot with a newer snapshot, replacing an older snapshot with a newer snapshot, modifying an existing snapshot, erasing an older snapshot and then writing a newer snapshot, and/or writing a newer snapshot and then erasing an older snapshot, but is in no way intended to limit the invention.

Referring again to FIG. 12, method 1200 includes the optional operation of establishing a connection with a remote location. See optional operation 1212. As mentioned above, a connection may be established from a storage library to a remote location using an antenna, a local area network connection, an internet connection, etc. Furthermore, once the connection has been established, optional operation 1214 includes transmitting the snapshot to a remote location. Again, depending on the approach, a snapshot may be transmitted to a remote location in addition to, or in place of, saving the snapshot itself to the memory. In some approaches, snapshots may be sent to a remote location in addition to being saved to the memory, e.g., for redundancy, for additional processing, to inform a user, for analysis by a support center, etc. Thus, optional operations 1212 and 1214 may be implemented when it is desired that a redundant copy of a snapshot is stored at a remote location, or that a snapshot is stored at a remote location in general.

It should be noted that method 1200 may return to operation 1202 and wait to receive another input from the designated mechanism in response to the designated mechanism being triggered again.

The ability to capture a snapshot without requiring any further action, e.g., such as a system login, access verification, library commands, software navigation, data collection prompts, etc., is a significant improvement over existing storage libraries. As mentioned above, the amount of time and effort involved with retrieving logs in existing storage libraries is burdensome, much less logs having a desired set of data therein. Many times, retrieving a log in an existing storage library includes locating a user interface for the library, logging in to that user interface, navigating to a service screen, locating a log download link or button, selecting a location to store the file(s), and finally downloading the necessary logs to a storage device. In addition, the user or service technician may be more interested in correcting a problem with the library than going through the effort to collect logs first. As such, technicians often neglect to collect a log altogether for existing storage libraries, or if they do, it is collected too late (e.g. after the data in the log corresponding to the error event has been overwritten).

In sharp contrast, various embodiments described herein may enable a snapshot of one or more data logs to be captured in direct response to triggering a designated physical and/or logical mechanism without requiring any further action. Thus, automated data storage systems may achieve improved data logs by implementing a physical and/or logical mechanism according to any of the approaches described herein, that when triggered, causes a data storage library to capture a snapshot for later retrieval and/or export (e.g., to perform root cause analysis). As a result, some of the embodiments described herein may be able to achieve first time data recovery while also preventing data overwriting as described above.

It should also be noted that any one or more of the approaches described and/or suggested herein may be implemented in an existing data storage library that does not already have such functionality, e.g., by implementing a new logical and/or physical mechanism, adding dual functionality to an existing logical and/or physical mechanism as described above, etc.; and/or may be implemented in new data storage libraries, e.g., as they are designed or constructed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system for decreasing delay in capturing log snapshots, comprising:
   an automated data storage library, comprising:
      a designated physical mechanism accessible at the automated data storage library, wherein the designated physical mechanism is integrated in a housing of the automated data storage library;
      a processor;
      a memory;
      an accessor for transporting removable media within the automated data storage library; and
      logic integrated with the processor, executable by the processor, or integrated with and executable by the processor, the logic being configured to:
         capture a snapshot of one or more logs of the automated data storage library in response to the designated physical mechanism being triggered,
         pause operation of the accessor in addition to capturing the snapshot in response to the designated physical mechanism being triggered, and
         store the snapshot in the memory,
      wherein the designated physical mechanism is accessible at an exterior of the automated data storage library.

2. The system as recited in claim 1, wherein the snapshot includes trace information and/or diagnostic information, wherein the trace information and the diagnostic information corresponds to one or more events experienced by the automated data storage library.

3. The system as recited in claim 1, the logic being configured to:
   determine whether a total amount of previously-stored snapshots stored in the memory of the automated data storage library exceeds a threshold; and
   overwrite a selected previously-stored snapshot in the memory of the automated data storage library with the snapshot in response to a determination that the total amount of snapshots stored in the memory of the automated data storage library exceeds the threshold,
   wherein the automated data storage library is a magnetic tape library,
   wherein the removable media includes data storage cartridges,
   wherein the data storage cartridges are stored in multi-cartridge deep slot cells and/or single cartridge storage slots in the magnetic tape library,
   wherein the snapshot includes information selected from the group consisting of trace information, diagnostic information, statistical information, configuration information, backup information, and database information,
   wherein the designated physical mechanism is integrated in an external housing of the automated data storage library.

4. The system as recited in claim 1, wherein the designated physical mechanism comprises a push button, and wherein the designated physical mechanism is triggered in response to a human operator depressing the push button.

5. The system as recited in claim 1, wherein the automated data storage library is configured to transmit the snapshot to a remote location.

6. The system as recited in claim 1, with a proviso that the designated physical mechanism is triggerable without performing: a system login, access verification, library commands, software navigation, or data collection prompts.

7. The system as recited in claim 1, wherein the automated data storage library is a magnetic tape library, wherein the removable media includes data storage cartridges, wherein the data storage cartridges are stored in multi-cartridge deep slot cells and/or single cartridge storage slots in the magnetic tape library.

8. The system as recited in claim 1, the logic being configured to:
   overwrite a selected previously-stored snapshot in the memory of the automated data storage library with the snapshot.

9. The system as recited in claim 1, the logic being configured to:
   determine whether a total amount of previously-stored snapshots stored in the memory of the automated data storage library exceeds a threshold; and overwrite a selected previously-stored snapshot in the memory of the automated data storage library with the snapshot in response to a determination that the total amount of snapshots stored in the memory of the automated data storage library exceeds the threshold, wherein a portion of the memory in which the snapshots are stored is configured as a circular buffer, wherein the overwriting the selected previously-stored snapshot is performed in a first-in-first-out manner.

10. A system for decreasing delay in capturing log snapshots, comprising:
an automated data storage library, comprising:
removable media configured to be physically transported within the automated data storage library;
a designated logical mechanism accessible on a display device of the automated data storage library, wherein the automated data storage library is configured to capture a snapshot of one or more logs in response to the designated logical mechanism being triggered; and
a memory, wherein the automated data storage library is configured to store the snapshot in the memory,
wherein the display device is integrated in a housing of the automated data storage library,
wherein the designated logical mechanism has dual functionality upon being triggered,
wherein the automated data storage library is configured to pause operation of the automated data storage library in addition to capturing the snapshot in response to the designated logical mechanism being triggered.

11. The system as recited in claim 10, wherein the designated logical mechanism is a logical button displayed on the display device.

12. The system as recited in claim 10, wherein the snapshot includes information selected from the group consisting of trace information, and diagnostic information.

13. The system as recited in claim 12, wherein the display device is accessible at an exterior of the automated data storage library.

14. The system as recited in claim 10, wherein the automated data storage library is configured to transmit the snapshot to a remote location using an electrical connection in addition to storing the snapshot in the memory in response to determining that an amount of information stored in the memory is in a predetermined range.

15. The system as recited in claim 10, with a proviso that the designated logical mechanism is triggerable without performing: menu navigation, screen navigation, data log download option selection, data log storage location selection, username entry, or password entry.

16. The system as recited in claim 10, comprising:
an accessor configured to physically transport the removable media within the automated data storage library; and
at least one tape drive,
wherein the automated data storage library is a magnetic tape library,
wherein the removable media includes magnetic tape cartridges.

17. The system as recited in claim 10, wherein storing the snapshot in the memory includes:
determining whether a total amount of snapshots stored in the automated data storage library exceeds a threshold; and
overwriting a selected stored snapshot in the automated data storage library with the captured snapshot in response to determining that the total amount of snapshots stored in the automated data storage library exceeds the threshold.

18. A system, comprising:
an automated data storage library, comprising:
an accessor for transporting removable media within the automated data storage library;
a designated physical mechanism accessible at an exterior of the automated data storage library, wherein the automated data storage library is configured to: pause operation of the accessor in addition to capture a snapshot of one or more logs in response to the designated physical mechanism being triggered via human interaction with the designated physical mechanism; and
a memory, wherein the automated data storage library is configured to store the snapshot in the memory,
wherein the designated physical mechanism is a switch or a mechanism that physically moves upon application of a force thereto by the human,
wherein the designated physical mechanism is integrated in a housing of the automated data storage library,
wherein the snapshot includes trace information and/or diagnostic information,
wherein the automated data storage library is configured to transmit the snapshot to a remote location.

* * * * *